United States Patent
Schneider

(10) Patent No.: US 9,552,077 B2
(45) Date of Patent: *Jan. 24, 2017

(54) CUSHIONED USER INTERFACE OR CONTROL DEVICE

(71) Applicant: Ergonomic Ingenuity, LLC, Milwaukee, WI (US)

(72) Inventor: Paul W. Schneider, Oconomowoc, WI (US)

(73) Assignee: Ergonomic Ingenuity, LLC, Milwaukee, WI (US)

( * ) Notice: Subject to any disclaimer, the term of this patent is extended or adjusted under 35 U.S.C. 154(b) by 275 days.

This patent is subject to a terminal disclaimer.

(21) Appl. No.: 14/322,112

(22) Filed: Jul. 2, 2014

(65) Prior Publication Data
US 2014/0313126 A1 Oct. 23, 2014

Related U.S. Application Data

(63) Continuation of application No. 13/975,793, filed on Aug. 26, 2013, now Pat. No. 8,786,545, which is a continuation of application No. 11/969,883, filed on Jan. 5, 2008, now Pat. No. 8,519,946.

(60) Provisional application No. 60/883,614, filed on Jan. 5, 2007, provisional application No. 60/884,102, filed on Jan. 9, 2007.

(51) Int. Cl.
*G06F 3/033* (2013.01)
*G06F 3/02* (2006.01)

(52) U.S. Cl.
CPC ............. *G06F 3/0208* (2013.01); *G06F 3/021* (2013.01); *G06F 3/0202* (2013.01); *G06F 3/033* (2013.01)

(58) Field of Classification Search
None
See application file for complete search history.

(56) References Cited

U.S. PATENT DOCUMENTS

| | | |
|---|---|---|
| 1,928,806 A | 10/1933 | Barcalo |
| 1,934,254 A | 11/1933 | Barcalo |
| 4,018,479 A | 4/1977 | Ball |
| 4,162,696 A | 7/1979 | Sprung |
| 4,837,590 A | 6/1989 | Sprague |

(Continued)

OTHER PUBLICATIONS

PCT/US2015/049308, International Search Report and Written Opinion, dated Dec. 18, 2015, 14 pages.

(Continued)

*Primary Examiner* — Adam R Giesy
(74) *Attorney, Agent, or Firm* — Boyle Fredrickson, S.C.

(57) ABSTRACT

A user interface or control includes a cushion-type support member and a user input member that is interconnected with and carried by the support member. The support member defines an upwardly facing recess, and the input member may be a user interface or control device that is contained within the upwardly facing recess. The support member may be formed to surround the recess about the user interface or control device. The support member may include an air vent that vents air exhausted from the user interface or control device. The user interface or control device may be a laptop computer having a body including a keyboard contained within the recess, and a screen carried by the body. The user interface or control device may alternatively be an electronic input member having an upwardly facing screen, a convertible input member movably mounted to a mounting member, or a game controller.

23 Claims, 26 Drawing Sheets

(56) References Cited

U.S. PATENT DOCUMENTS

| | | |
|---|---|---|
| RE33,402 E | 10/1990 | Thrush |
| D313,917 S | 1/1991 | Valliere |
| 5,002,184 A | 3/1991 | Lloyd |
| 5,029,260 A | 7/1991 | Rollason |
| 5,115,374 A | 5/1992 | Hongoh |
| RE33,970 E | 6/1992 | Butler |
| 5,134,245 A | 7/1992 | Katz |
| 5,214,574 A | 5/1993 | Chang |
| 5,217,119 A | 6/1993 | Hollingsworth |
| D358,270 S | 5/1995 | Diamond |
| 5,485,922 A | 1/1996 | Butcher |
| 5,494,157 A | 2/1996 | Golenz et al. |
| 5,570,780 A | 11/1996 | Miller |
| D376,948 S | 12/1996 | Sullins et al. |
| 5,607,054 A | 3/1997 | Hollingsworth |
| 5,632,373 A | 5/1997 | Kumar et al. |
| 5,639,004 A | 6/1997 | Carlton et al. |
| 5,647,484 A | 7/1997 | Fleming |
| 5,666,265 A | 9/1997 | Lutz et al. |
| 5,682,993 A | 11/1997 | Song |
| D389,360 S | 1/1998 | York et al. |
| 5,725,090 A | 3/1998 | Vermillion et al. |
| 5,729,549 A | 3/1998 | Kostreski et al. |
| D398,914 S | 9/1998 | Pulver |
| 5,819,942 A | 10/1998 | Sadow |
| 5,835,344 A | 11/1998 | Alexander |
| 5,893,540 A | 4/1999 | Scott |
| 5,905,719 A | 5/1999 | Arnold et al. |
| D415,532 S | 10/1999 | Tobin |
| 6,050,200 A | 4/2000 | Sullins et al. |
| 6,179,122 B1 | 1/2001 | Moncrief et al. |
| D476,662 S | 7/2003 | Knieper |
| 6,758,332 B2 | 7/2004 | Miller et al. |
| 6,820,852 B2 | 11/2004 | Wainscott et al. |
| 6,862,171 B1 | 3/2005 | Maskatia et al. |
| 7,280,355 B2 | 10/2007 | Taylor |
| 8,205,850 B2 | 6/2012 | Opresnik |
| 8,757,374 B1 | 6/2014 | Kaiser |
| 2004/0228084 A1 | 11/2004 | Zarek et al. |
| 2006/0138297 A1 | 6/2006 | Esimai |
| 2006/0152892 A1 | 7/2006 | Matsumoto et al. |
| 2006/0165230 A1 | 7/2006 | Parr |
| 2006/0274045 A1 | 12/2006 | Stenbroten |
| 2008/0150662 A1 | 6/2008 | Broumand |
| 2013/0249467 A1 | 9/2013 | Varghese |

OTHER PUBLICATIONS

Amazon.com, "Lapp Topper Vinyl & Plastic Lap Desk (Navy Blue)," downloaded Jun. 20, 2011.

Amazon.com, "Lapp Topper Vinyle & Plastic Lap Desk (Navy Blue)," customer review of P.J. Woods dated Oct. 13, 2006, downloaded Jun. 20, 2011.

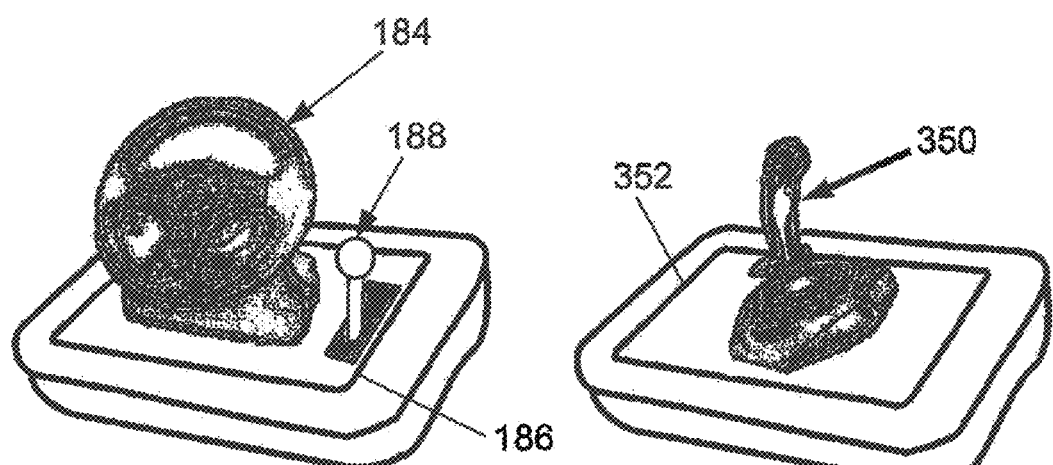
Fig. 41
Fig. 42
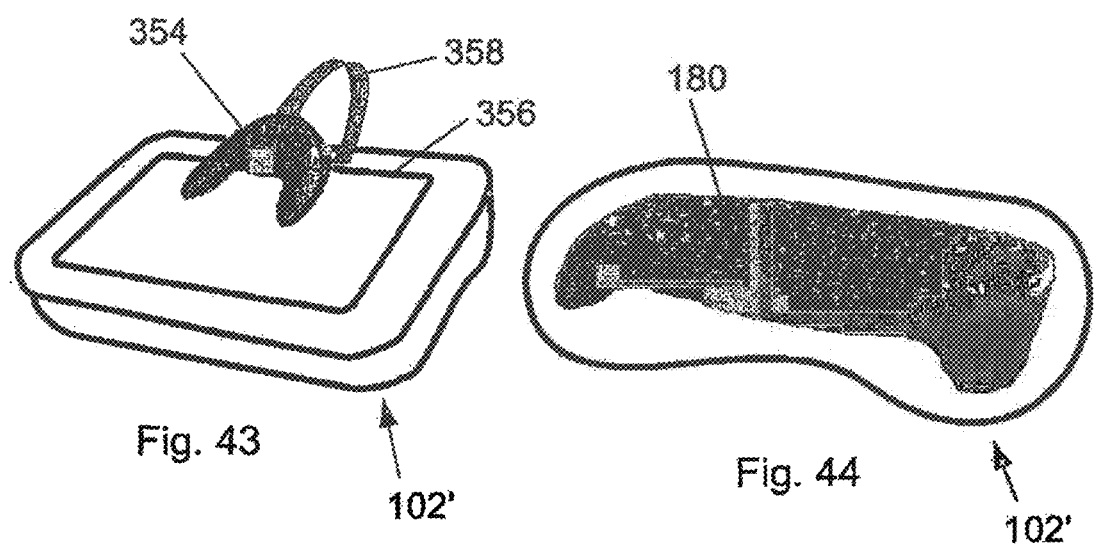
Fig. 43
Fig. 44

CUSHIONED USER INTERFACE OR CONTROL DEVICE

CROSS-REFERENCE TO RELATED APPLICATION

This application is a continuation of U.S. application Ser. No. 13/975,793 filed Aug. 26, 2013, now U.S. Pat. No. 8,786,545, which is a continuation of U.S. application Ser. No. 11/969,883, filed Jan. 5, 2008, now U.S. Pat. No. 8,519,946, which claims the benefit of U.S. Provisional Application Ser. No. 60/883,614, filed Jan. 5, 2007, and U.S. Provisional Application Ser. No. 60/884,102, filed Jan. 9, 2007.

BACKGROUND AND SUMMARY

The present invention relates to a user interface or control device, and more particularly to a user interface or control device that can be comfortably and conveniently used by a user in numerous positions and for a variety of applications.

User interface or control devices are used for many purposes. In some applications, a user interface or control device is a peripheral component that allows a user to interact with another device, such as a desktop computer, a remote monitor, a central server, etc. In other applications, a user may interact directly with the interface or control device. Examples of the latter include laptop computers, digital sketch boards, digital game boards, etc.

Increasingly, user interface or control devices are being designed so as to facilitate ease of use and user comfort. For example, wireless keyboards and other peripheral devices, such as computer mice, make it significantly easier for a user to interface with a computer without the position and distance limitations involved in wire-type peripheral devices. However, the reality is that there are limitations in the way that most user interface or control devices can be used. While a user may be able to place a wireless keyboard in his or her lap, the keyboard may not be optimally positioned relative to the user's hands, and the user must change the position of his or her legs in order to change the position of the keyboard. The same holds true with respect to laptop computers, touch screen tablets, video game boards, video game controllers, etc. Thus, there are limitations in the length of time such devices can be comfortably used, as well as in the positions in which such devices can be placed relative to the user's body.

Is an object of the present invention to provide a user interface or control device that can be comfortably and conveniently used by a user in numerous positions and for a variety of applications. It is another object of the present invention to provide a user interface or control device in which the user can vary the position of his or her hands in order to increase or enhance user comfort. It is another object of the invention to provide a user interface or control device which can be adapted for use with numerous types of input devices and controllers. Yet another object of the invention is to provide a user interface or control device which can be used to control numerous other systems or devices from one location. A still further object of the invention is to provide a user interface or control device in which a number of enhancements can be incorporated in order to further increase user comfort.

In accordance with the present invention, a user interface or control device generally consists of a cushion-type support member and a user input member that is interconnected with and carried by the cushion-type support member. The cushion-type support member defines an upwardly facing recess, and the input member is in the form of a user interface or control device that is contained within the upwardly facing recess of the support member. The support member may be formed so as to peripherally surround the upwardly facing recess about the user interface or control device. The support member may include an air vent arrangement that opens into the recess, so as to vent air exhausted from the user interface or control device. In one form, the user interface or control device may be in the form of a laptop computer having a body including a keyboard contained within the recess, and a foldable screen carried by the body. The user interface or control device may alternatively be in the form of an electronic input member having an upwardly facing screen. The user interface or control device may alternatively include a mounting member contained within the recess of the support member, and a convertible member movably mounted to the mounting member. The convertible member may include a keyboard facing in a first direction and a screen facing in a second direction opposite the first direction, so that the convertible member is movable between a first orientation in which the keyboard faces upwardly and the screen faces downwardly, and a second orientation in which the screen faces upwardly and the keyboard faces downwardly.

The cushion-type support member may include a hardware interface area that is interconnected with the user interface or control device. The hardware interface area is preferably located on a side surface of the support member that faces laterally relative to the user interface or control device.

The cushion-type support member may include an outer skin and a cushion material enclosed by the outer skin. The cushion material may be constructed of a foam material, e.g. a beaded foam material. Alternatively, the cushion member may be in the form of a fluid-containing member such as an air bladder.

In accordance with another aspect, the present invention contemplates an interactive system including a processing unit which may be interconnected with a monitor having a screen, a signal receiver interconnected with the processing unit, and a cushion-type support member that includes a user input member. The user input member includes a user input area and is operable to emit signals in response to user inputs. The signals are received by the signal receiver, and transferred by the signal receiver to the processing unit. The interactive system may be used in a variety of applications.

In accordance with yet another aspect, the present invention contemplates a user interface or control device, in the form of a cushion member defining a mounting area. A user interface or control device is interconnected with the mounting area of the cushion member. The user interface or control device is arranged so as to be spaced above an upwardly facing surface defined by the cushion member. In one form, the user interface or control device may be in the form of a controller that is located above the upwardly facing surface of the cushion member. The controller may include a manual input member that is located above the upwardly facing surface of the cushion member. The manual input member may be in the form of a fixed position joystick-type or steering wheel controller that extends upwardly from a support interconnected with the cushion member, or may be in the form of a movable hand-held input member that is supported by an arm that extends outwardly and above the cushion member.

Various other features, objects and advantages of the invention will be made apparent from the following description taken together with the drawings.

BRIEF DESCRIPTION OF THE DRAWINGS

The drawings illustrate the best mode presently contemplated of carrying out the invention. In the drawings:

FIGS. 41-44 are isometric views of various types of game-type cushioned user interface or control devices in accordance with the present invention;

DETAILED DESCRIPTION

Figure 1:
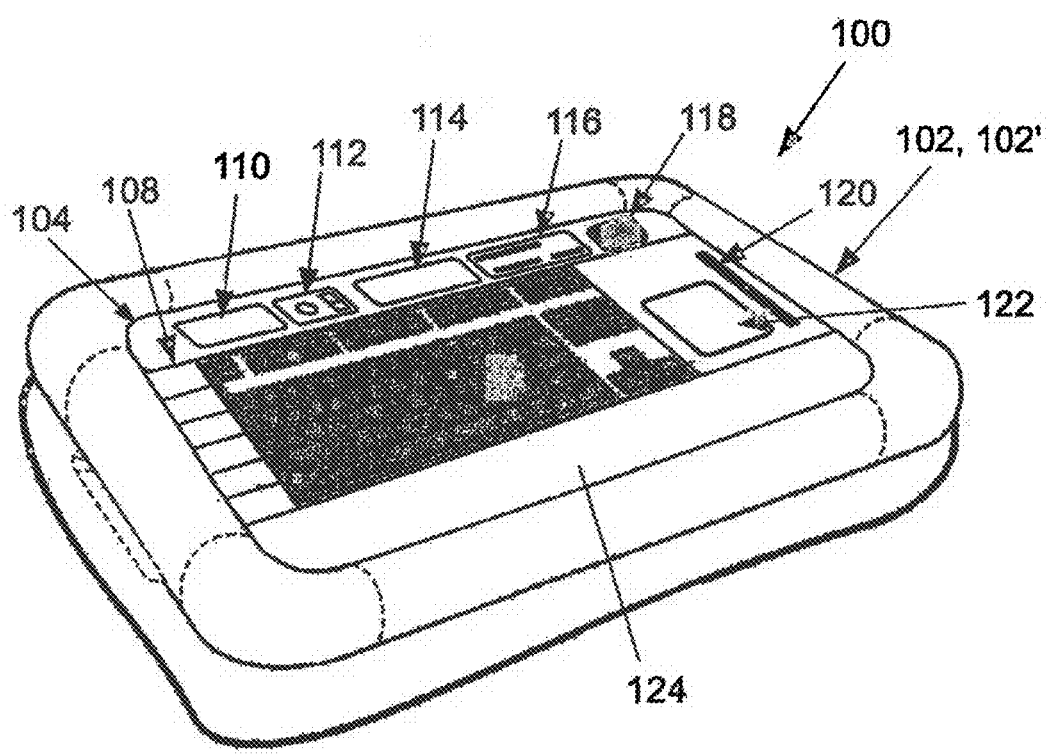
FIG. 1 is an isometric view of a cushioned user interface or control device in accordance with one embodiment of the present invention.
Figure 2:
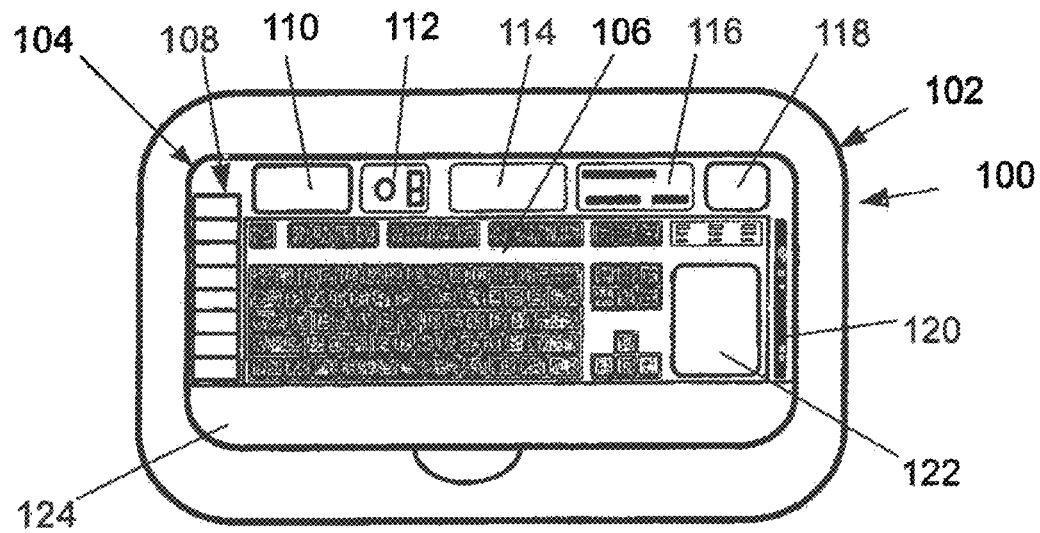
FIG. 2 is a top plan view of the cushioned user interface or control device of FIG. 1.

As shown in FIGS. 1 and 2, a user interface or control device in accordance with the present invention, shown generally at 100, generally includes a resilient or cushioned support member 102 in combination with an input member that enables a user to control or interact with another device. In FIGS. 1 and 2, the input member is in the form of a fully functioned keyboard assembly 104, which includes a keypad 106, a set of device actuation keys or buttons 108, an audio speaker 110, a camera 112, and he docking station or synchronizing cradle 114, a memory card or disc reader 116, an identification device 118 such as a fingerprint scanner, a card scanner at 120 such as for use in scanning credit cards or game cards, and a mouse-type touch pad 122. A wrist rest area 124 extends along one side of the keyboard assembly 104, for use in supporting a user's wrists when using keypad 106, in a manner as is known.

Figure 3:
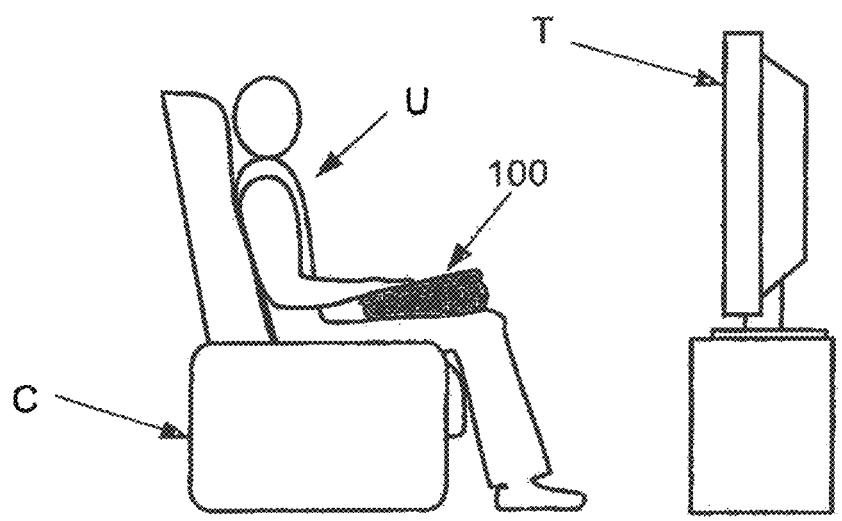
FIG. 3 is a side elevation view illustrating use of the cushioned user interface or control device of FIG. 1 by a user in a seated position.
Figure 4:
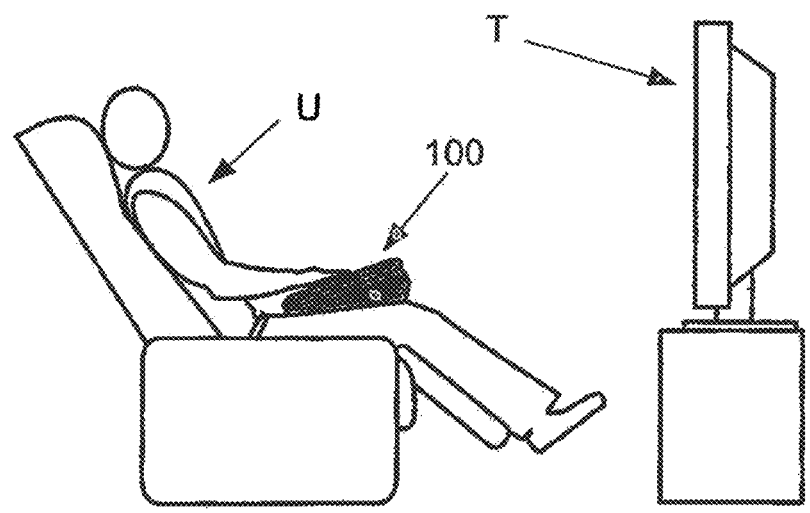
FIG. 4 is a side elevation view similar to FIG. 3 showing use of the cushioned user interface or control device by a user in a reclined position.
Figure 5:
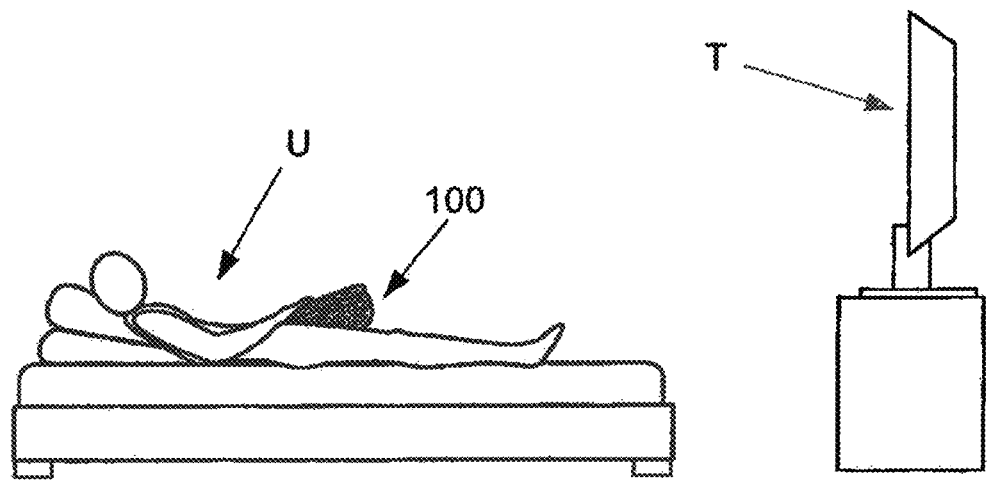
FIG. 5 is a side elevation views similar to FIGS. 3 and 4 showing use of the cushioned user interface or control device by a user in a prone position.

In a manner that will be more fully explained, user interface or control device 100 enables a user, shown at generally at U in FIGS. 3-5, to utilize keyboard assembly 104 in order to perform various functions in various positions. User U may employ user interface or control device 100 when in a seated position such as shown in FIG. 3, in which user U is seated in a chair C. As will be explained, user interface or control device 100 may be employed by user U to control a television T or other devices or equipment. As shown in FIG. 4, user U may also recline in chair C, and user interface or control device 100 allows user U to comfortably interact with keyboard assembly 104 when in a reclined position. As shown in FIG. 5, user U may also utilize user interface or control device 100 when in a generally prone position on a couch, bed or other such article of furniture, or on a floor. Again, user interface or control device 100 is constructed such that the user may comfortably interact with keyboard assembly 104 when lying down as shown.

Figure 6:
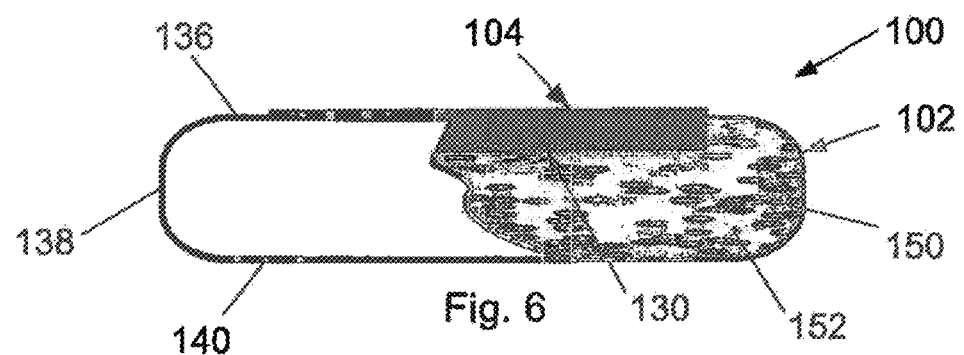
FIG. 6 is a cross-section view of the user interface or control device of FIGS. 1 and 2, showing a first embodiment of a cushion material incorporated in the cushioned user interface or control device.
Figure 13:
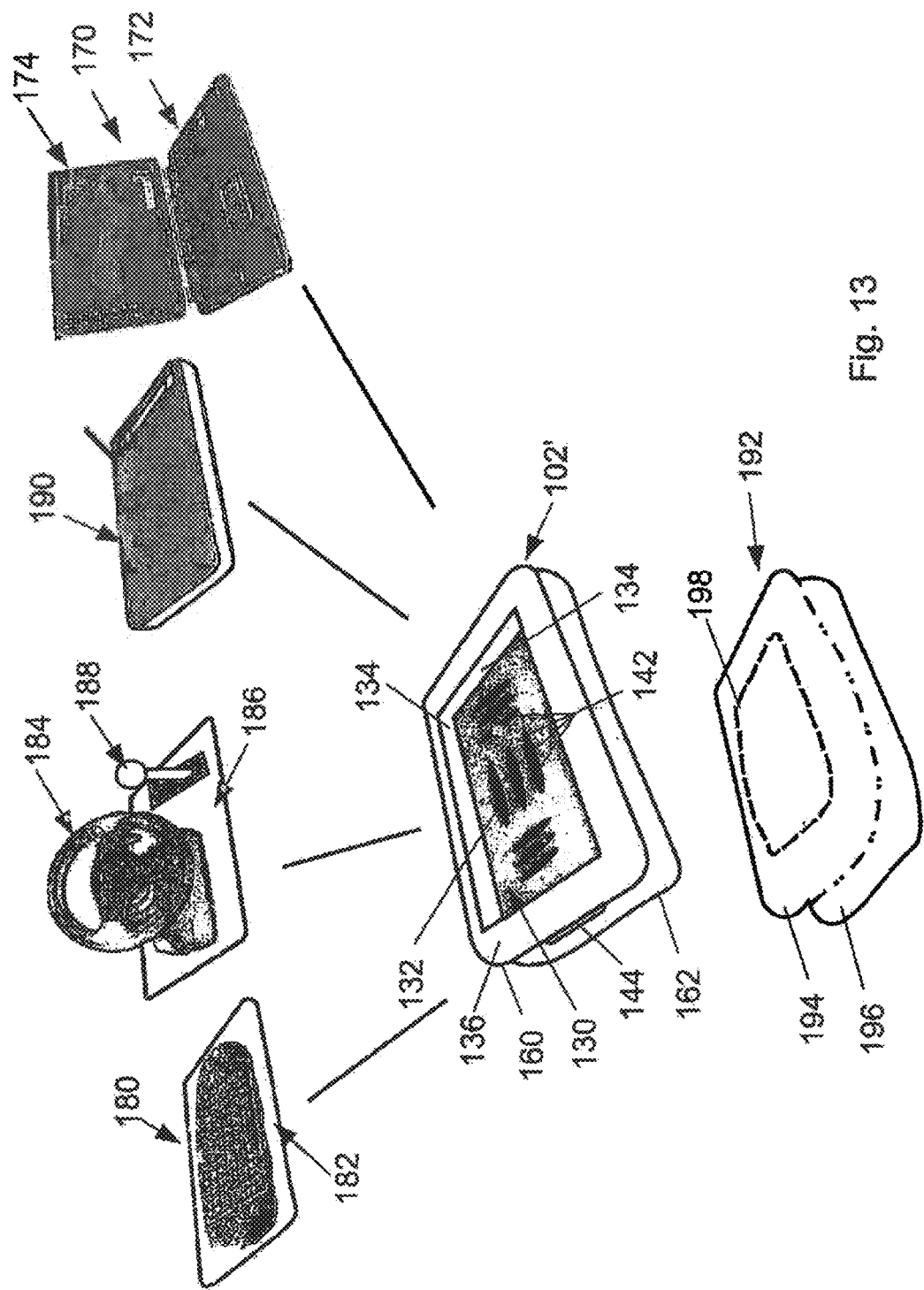
FIG. 13 is an exploded isometric view illustrating the construction of a cushion member utilized in the cushioned user interface or control device in accordance with the present invention, and showing various types of user input components that may be interconnected with the cushion member.

Referring to FIG. 6, support member 102 of user interface or control device 100 is formed to include a recess, shown generally at 130, within which the input member such as keyboard assembly 104 is received. Referring briefly to FIG. 13, the recess 130 is formed so as to include a generally flat bottom wall 132 and a series of sidewalls 134 that extend between bottom wall 26 and an upwardly facing surface of support member 10, shown at 136.

Support member 102 further defines a laterally facing peripheral side surface 138 and a downwardly facing underside or bottom surface 140. In the illustrated embodiment, support member 102 is shown as being generally rectangular. It is understood, however, that support member 102 may have any other form and shape as desired. Support member 102 is configured such that upwardly facing surface 136 of support member 102 peripherally surrounds recess 130 and the input member, e.g. keyboard assembly 104, positioned within recess 130.

Bottom wall 132 of recess 130 may be provided with a series of air vent inlets 142. An air vent outlet 144 is formed on any surface of support member 102 at a location spaced from recess 130, e.g. on one of side surfaces 138, and opens onto the exterior of support member 102. A conduit or passage is formed in the interior of support member 102, and establishes communication between air vent inlets 142 and air vent outlet 144. In this manner, air that is exhausted by the input member, can be routed from recess 130 to the exterior of support member 102, to ensure that the input member does not overheat.

Figure 7:
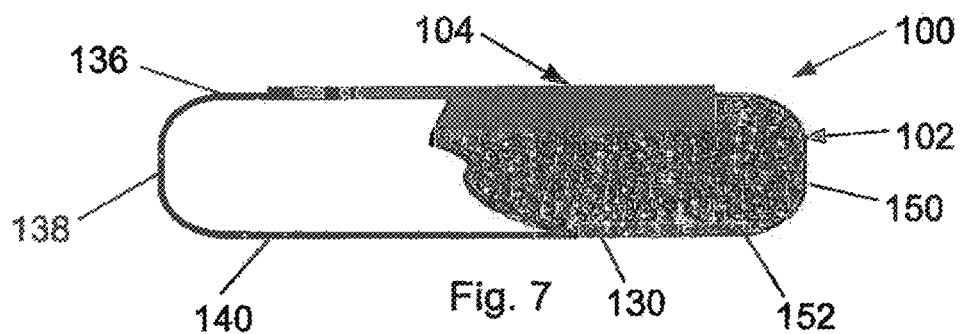
FIG. 7 is a view similar to FIG. 6 showing another embodiment of the cushion material incorporated in the cushioned user interface or control device
Figure 8:
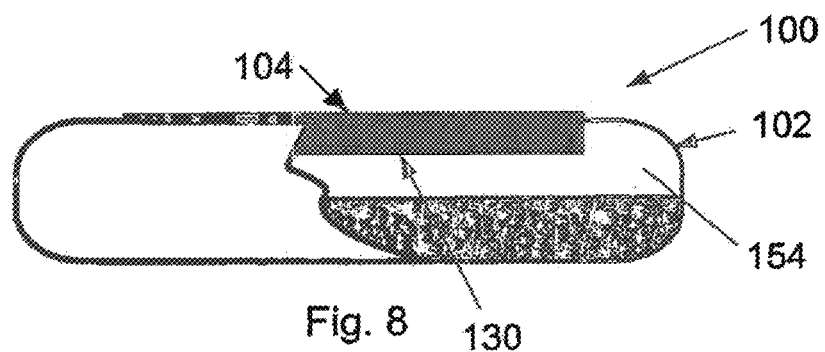
FIG. 8 is a view similar to FIGS. 6 and 7 showing another embodiment of the cushion structure incorporated in the cushioned user interface or control device.

FIGS. 6-9 show possible constructions of support member 102. In a preferred form, support member 102 is formed of a self-contouring cushioning material, which enables cushion member 102 to conform to the contours of any surface upon which support member 102 is placed. The outer surface of support member 102 may be formed of a skin or shell 150 which may be made of any satisfactory material such as Lycra, polyester, cotton, leather, etc. A foam material 152 may be contained within the interior of the outer shell or skin 150. In one embodiment, the foam material 152 may be a solid foam such as a memory foam, urethane foam, polypropylene, etc., as shown in FIG. 6. In another embodiment as shown in FIG. 7, the foam material 152 may be a foam material in bead or particle form, such as foam beads, buckwheat husks, etc. As shown in FIG. 8, the cushion member 102 may also include a fluid-filled member, such as an air bladder 154 or a polymer bladder. The air bladder or polymer bladder may be incorporated in cushion member 102 either on its own or in combination with a cushioning material, such as a solid foam layer as in FIG. 6 or a beaded foam layer as in FIG. 7.

Figure 9:
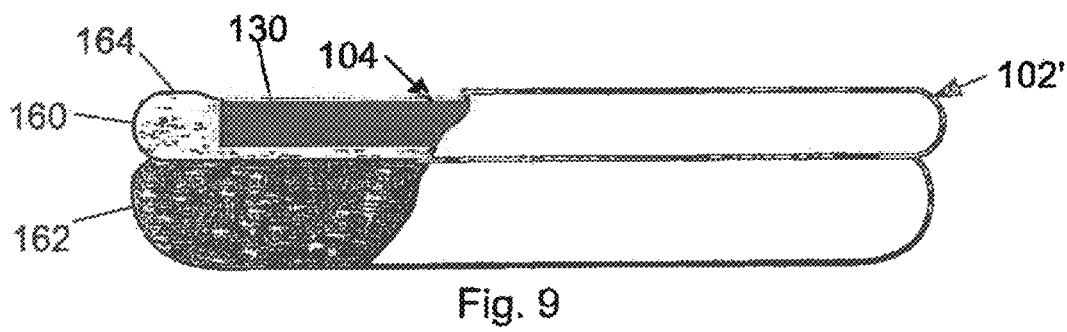
FIG. 9 is a cross-sectional view illustrating another embodiment of the cushion structure that may be incorporated in the cushioned user interface or control device in accordance with the present invention.

FIG. 9 illustrates another construction of the cushion member, shown at 102', which may be incorporated in the user input or control device 100. In this embodiment, the cushion member 102' has a sectioned construction including an upper section 160 and a lower section 162. The upper section 160 is formed so as to define recess 130 within which the input member, such as keyboard assembly 104, is received. In addition, the upper section 160 defines a peripheral area or border 164 which has a raised upper surface that is located above the upwardly facing components of keyboard assembly 104. With this construction, the keyboard assembly 104 is recessed into the upper section 160, such that the outer peripheral areas of keyboard assembly 104 are protected. The upper section 160 of cushion member 102' may be formed of a more rigid foam material to maintain the shape of upper section 160. Lower section 162 may be constructed as described above with respect to FIGS. 6-8, such that lower section 162 may be formed of a foam material or of bead or particle foam, with or without an air or polymer bladder as described.

Figure 10:
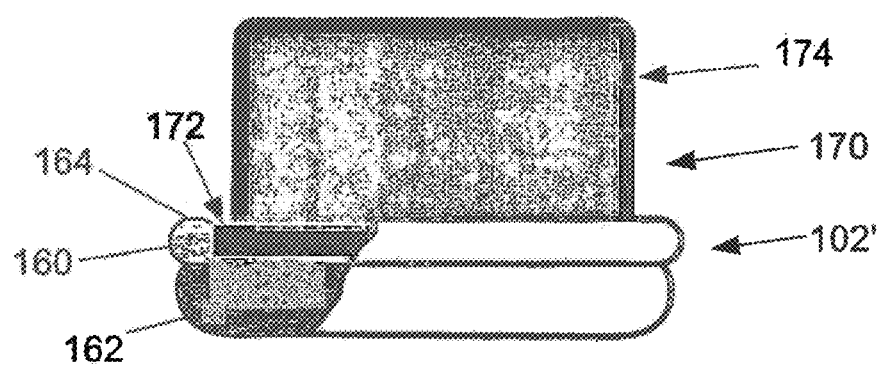
FIG. 10 is a front elevation view illustrating the cushioned user interface or control device as in FIG. 9, showing the interface or control device as a laptop computer.
Figure 11:
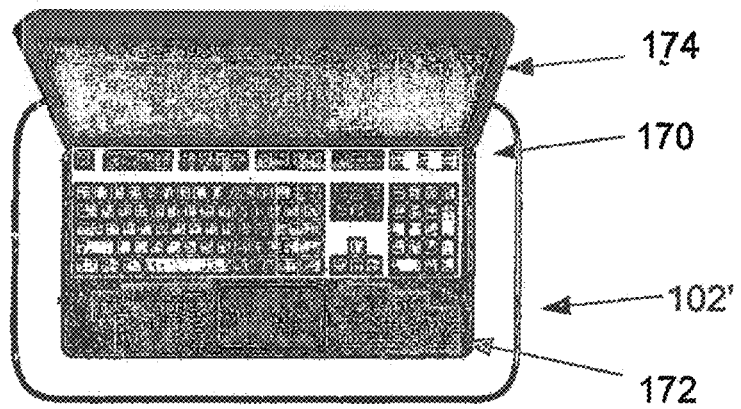
FIG. 11 is a top plan to of the laptop computer cushioned user interface or control device of FIG. 10.
Figure 12:
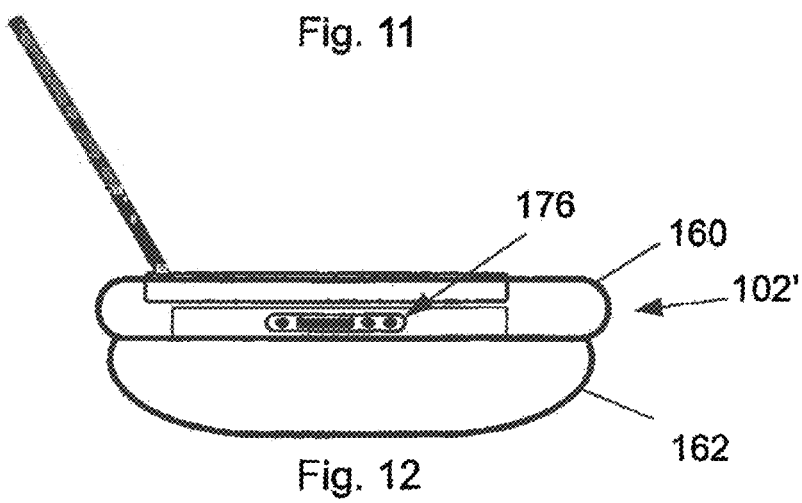
FIG. 12 is a side elevation view of the laptop computer cushioned user interface or control device of FIGS. 10 and 11

FIGS. 10-12 illustrate an alternative user input member that may be interconnected with a cushioned support member in accordance with the present invention. In this embodiment, the user input member is in the form of a notebook or laptop-type computer 170 that includes a keyboard section 172 and a foldable display or screen section 174. Computer 170 has a relatively conventional construction, such that screen section 174 can be moved from an open position as shown in FIGS. 10-12 to a closed position in which screen section 174 overlies keyboard section 172. The support member is in the form of support member 102', although it is understood that any other satisfactory embodiment of the cushioned support member may be employed. In this embodiment, keyboard section 172 of computer 170 is placed into recess 130 of support member 102', in the same manner as keyboard assembly 104 as described above. The peripheral area or border 164 of upper section 160 forms a raised upper surface that is located above the upwardly facing components of keyboard section 172 of computer 170.

Computer 170 may be permanently secured to support member 102' such that keyboard section 172 cannot be removed from recess 130. Alternatively, keyboard section 172 may be removably secured within recess 130. In the former version, the external ports, plugs and interface components of the computer 170 may be built into cushion member 102' as shown at 176. In the latter version, and alternatively in the former version, the support member 102' may be provided with access openings through which the external ports, plugs and interface components of the computer 170 can be accessed.

FIG. 13 illustrates the manner in which the user interface or control device of the present invention may be adapted for use in various applications. In the embodiment of FIG. 13, support member 102' is constructed as described previously, including upper section 160 and lower section 162. Support member 102' is adapted to receive and support any type and configuration of user input member that is configured to be received within recess 130. Representative user input members include a keyboard-type game controller 180 carried by a mounting member in the form of a base or platform 182; a steering wheel-type game controller 184 carried by a mounting member in the form of a base or platform 186, and which may include a control lever 188 also interconnected with base or platform 186; an electronic drawing or sketch board 190, and laptop computer 170 as discussed previously. In each instance, the bases or platforms 186, the drawing or sketch board 190, and the keyboard section 172 are configured to be received and engaged within recess 130 defined by support member 102'. In this manner, the various user input members 180, 184, 190 and 170 may be interchangeably secured to support member 102'. The support member 102' allows a user to place the input member in any desired position on any desired surface, which enables the user to comfortably and conveniently operate the input member. In the case of computer 170, the air vent inlets 142 and outlet 144 allow air to be exhausted from recess 130 in response to operation of the cooling fan of the computer 170, to prevent overheating.

In addition, a sleeve or cover 192 may be placed about the exposed surfaces of support member 102'. Cover 192 defines an interior having the same overall shape as the exterior of support member 102', including an open upper section 194 shaped to conform to upper section 160 and a closed lower section 196 shaped to conform to lower section 162. The open upper section has an upper wall adapted to overlie upper surface 136, and which defines has a peripheral inner edge 198 which defines an opening that is configured to be placed over and above recess 130. The inner edge 198 is adapted to be placed inwardly of the walls 134 that define recess 130 so that, when the input member is positioned within the recess 130, the input member function to tuck the material of cover 192 into recess 130 and to thereby retain cover 192 in position over support member 102'. It is understood that this is but one satisfactory way in which the cover 192 may be secured to support member 102', and that cover 192 may also be retained in position on support member 102' using hook or snap-type fasteners, hook-and-loop fastening strips or members, or in any other satisfactory manner. With this construction, the user may remove cover 192 as necessary for cleaning or replacement, and may also interchange different covers 192 according to a desired style, color, etc.

Figure 14:
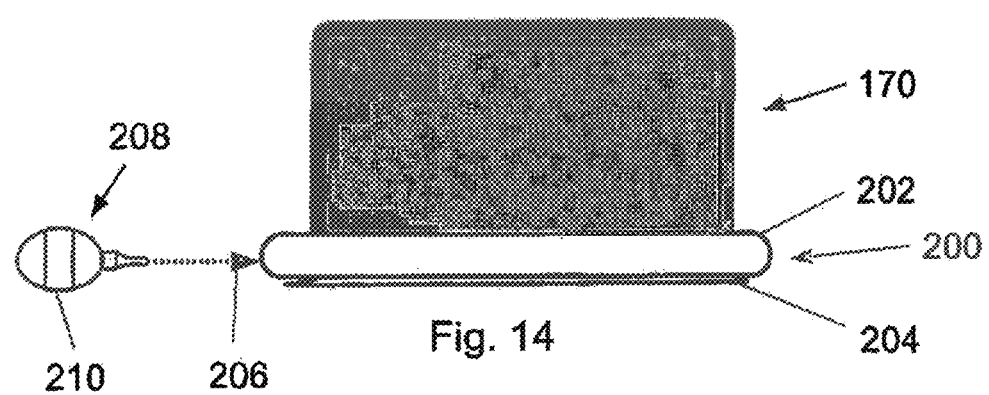
FIGS. 14-16 are a front elevation views illustrating the cushioned user interface or control device in accordance with the present invention, incorporating an inflatable bladder for altering the cushioning characteristics of the cushion member.
Figure 15:
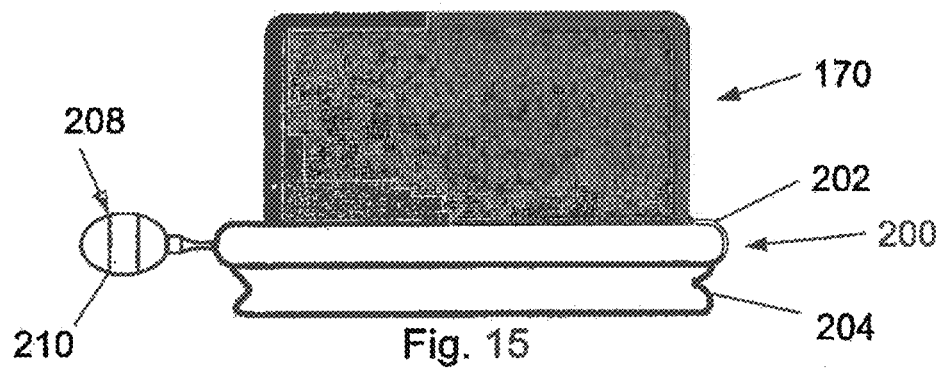
Figure 16:
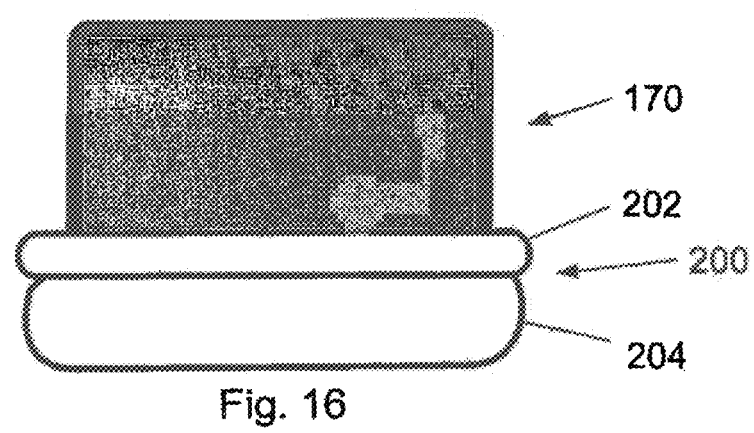
Figure 17:
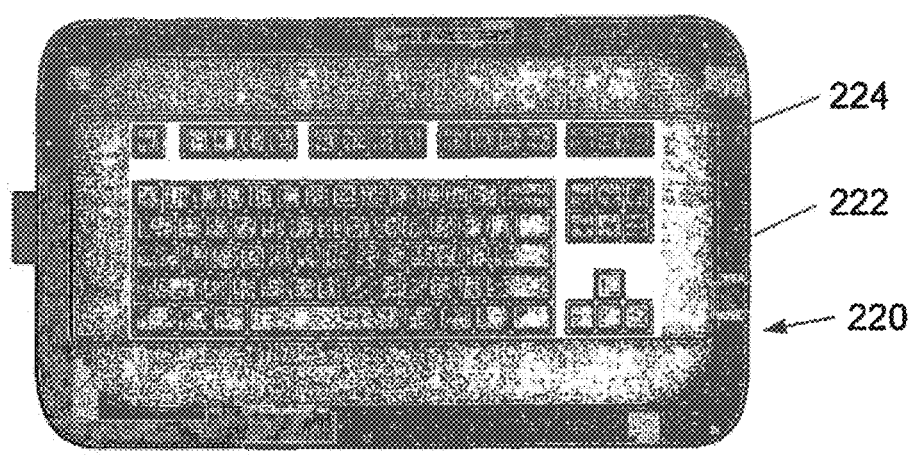
FIG. 17 is a top plan of the cushioned user interface or control device in accordance with the present invention, and incorporating a variable configuration in keyboard-type input device.
Figure 18:
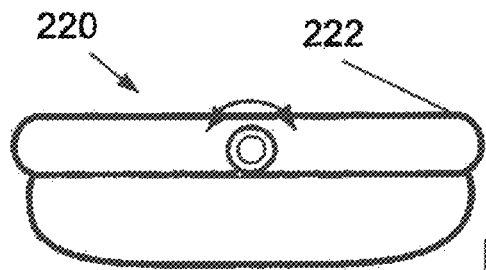
FIG. 18 is a side elevation view of the cushioned user interface or control device of FIG. 17.
Figure 19:
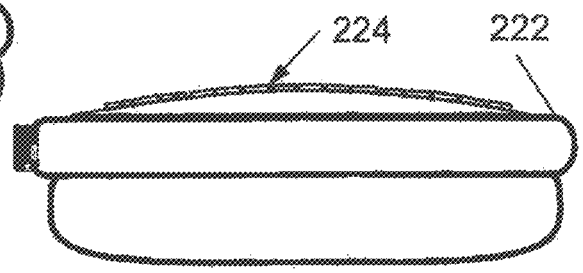
FIG. 19 is a front elevation view of the cushioned user interface or control device of FIGS. 17 and 18, showing the keyboard-type input device in a convex position.
Figure 20:
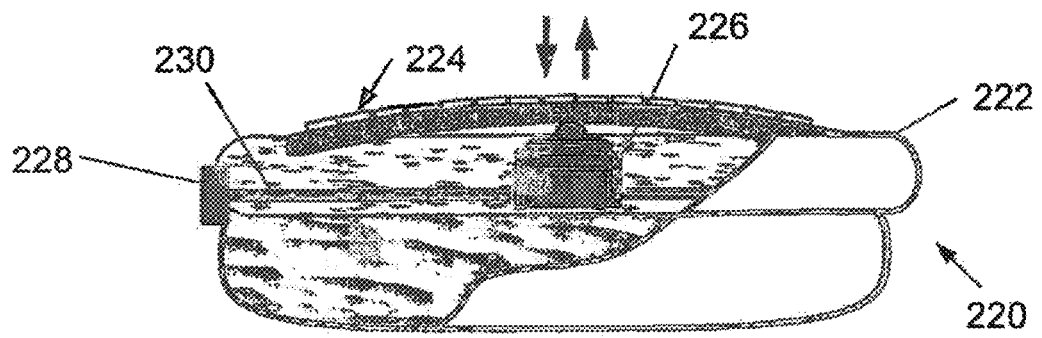
FIG. 20 is a partial section view showing the cushioned user interface or control device as in FIG. 19 and the keyboard-type input device in the convex position

FIGS. 14-16 illustrate an adjustment feature that may be incorporated in the user interface or control device of the present invention. In this version, a support member 200 includes a recessed upper section 202 having the same general construction as upper section 160 of support member 102' as shown and described previously. Representatively, the recessed upper section 202 may support a user input member in the form of laptop computer 170, although it is understood that any other satisfactory input member may be supported by upper section 202. In addition, support member 200 includes an inflatable lower section 204, which may or may not include a resilient or cushioned layer or component. In this version, lower section 204 is provided with an air valve 206, which is configured to receive the air outlet of a manually operated band pump 208 having a squeeze bulb 210. With this construction, support member 200 may be used with lower section 204 in a deflated condition as shown in FIG. 14, or with lower section 204 in a partially inflated condition as shown in FIG. 15 or a fully inflated condition as shown in FIG. 16, according to the desired position of the user input member and the surface that underlies the support member 200.

FIGS. 17-20 illustrate another adjustment feature that may be incorporated in the user interface or control device of the present invention. In this version, a support member 220 includes a recessed upper section 222 having the same general construction as upper section 160 of support member 102' as shown and described previously. Representatively, the recessed upper section 222 may support a user input member in the form of a flexible keyboard assembly 224. An adjustable internal jack 226 underlies keyboard assembly 224, and is adapted to be raised and lowered in response to an external actuator knob 228 which is interconnected with jack 226 via a drive shaft or rod 230. With this construction, the user may rotate knob 228 in order to rotate drive shaft or rod 230, which in turn causes jack 226 to raise or lower. When jack 226 is raised, the central area of flexible keyboard assembly 224 is lifted relative to its ends, which causes keyboard assembly 224 to assume a generally convex configuration. Conversely, lowering jack 226 causes the central area of keyboard assembly 224 to flatten. In this manner, the user can adjust the configuration of keyboard assembly 224 to attain a desired ergonomic position according to the specific requirements of the user.

Figure 21:
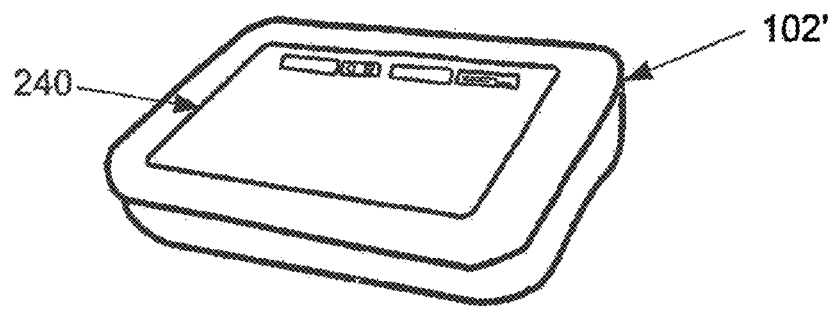
FIG. 21 is an isometric view of a screen-type cushioned user interface or control device in accordance with the present invention.
Figure 22:
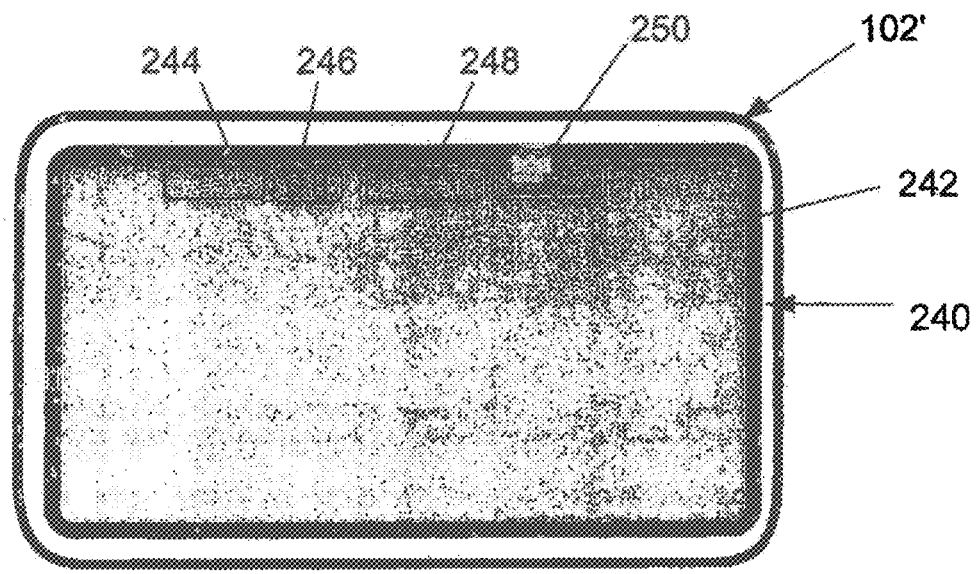
FIG. 22 is a top plan view of the screen-type cushioned user interface or control device of FIG. 21.
Figure 23:
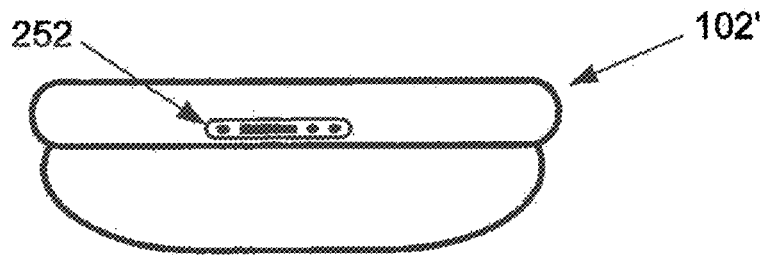
FIG. 23 is a side elevation view of the screen-type cushioned user interface or control device of FIGS. 21 and 22
Figure 24:
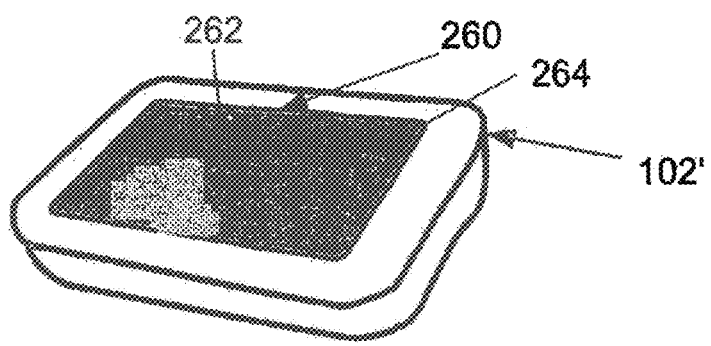
FIG. 24 is an isometric view of a convertible cushioned user interface or control device in accordance with the present invention.
Figure 25:
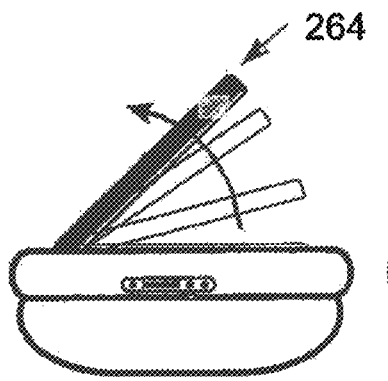
FIGS. 25-27 are side elevation views illustrating movement of the convertible screen incorporated in the convertible cushioned user interface or control device of FIG. 24.
Figure 26:
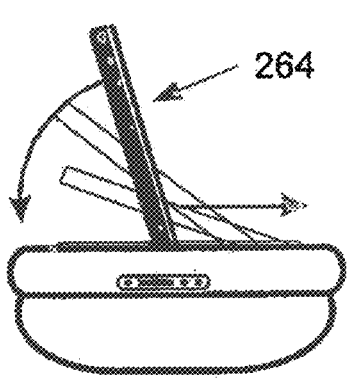
Figure 27:
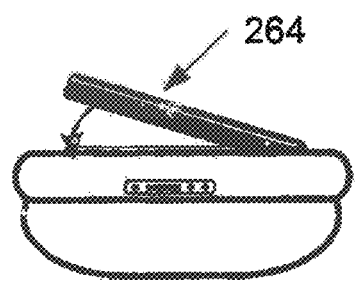
Figure 28:
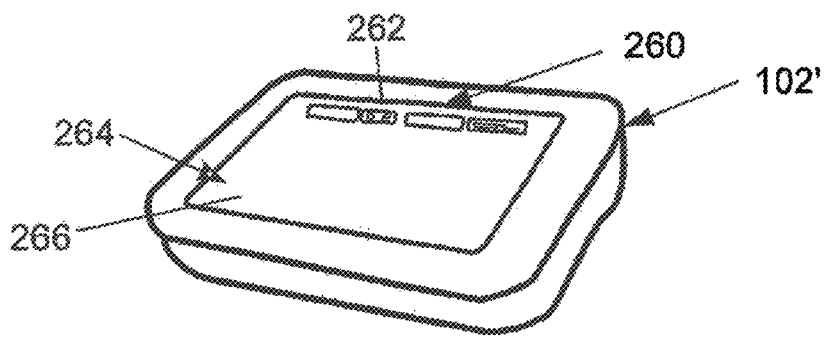
FIG. 28 is an isometric view similar to FIG. 24 showing the screen of the convertible cushioned user interface or control device in an upwardly facing position.

FIGS. 21-23 illustrate a stand-alone screen-type user interface or control device in accordance with the present invention. In this embodiment, the user input member is in the form of an interactive flat screen member 240 which is positioned within recess 130 of support member 102'. The flat screen member includes a relatively large user interface screen area 141, and may also include one or more of an audio speaker 244, a camera 246, a docking station 248, and a memory card or disc reader section 250. The flat screen member 240 may be permanently secured to support member 102' such that flat screen member 240 cannot be removed from recess 130. Alternatively, flat screen member 240 may be removably secured within recess 130. In the former version, the external ports, plugs and interface components of the flat screen member 240 may be built into cushion member 102' as shown at 252. In the latter version, and alternatively in the former version, the support member 102' may be provided with access openings through which the external ports, plugs and interface components of the flat screen member 240 can be accessed.

FIGS. 24-28 illustrate a convertible input member 260 that can be used in the user interface or control device of the present invention. In this embodiment, the convertible user input member 260 generally consists of a mounting member 262 that is secured within recess 130 of support member 102'. Mounting member 262 has a tray-type construction defining an upwardly facing cavity or recess, and has a shape that corresponds to that of recess 130 in support member 102'. The bottom wall of support member 262 may include air vent inlets that enable air to pass through air vent inlets of support member 102' for discharge through air vent outlet 144. The convertible input member 260 further includes a dual sided input or interface member 264 that is movably mounted to mounting member 262. In the illustrated embodiment, interface member 264 has a first side that is in the form of a screen 266 that can function as a sketch pad, an LCD tablet or a scanner. Interface member 264 also defines a second side, which may simply be in the form of a protective panel 268 as shown in the drawing figures, or which may be in the form of an input keyboard. Interface member 264 is configured so as to fit within recess 130 defined by mounting member 260, and can be moved relative to mounting member 260 between a first position in which panel 268 (or the keyboard) faces upwardly and screen 266 faces downwardly, and a second position in which panel 268 (or the keyboard) faces downwardly and screen 266 faces upwardly. To accomplish this, interface member 42 is essentially "flipped" between the first and second positions. Representatively, a pin may extend outwardly from each side of interface member 264. Each pin is received within a track or slot formed in one of the sidewalls of mounting member 260, so that one end of interface member 264 is movably anchored to mounting member 260. The user can selectively lift the opposite end of interface member 264 outwardly from the recess defined by mounting member 260 and move the pins within the slots to the other side of mounting member 260, and then reposition the upper end of the interface member 264 into the recess defined by mounting member 260, to selectively expose either panel 268 (or the keyboard) or screen 266.

Figure 29:
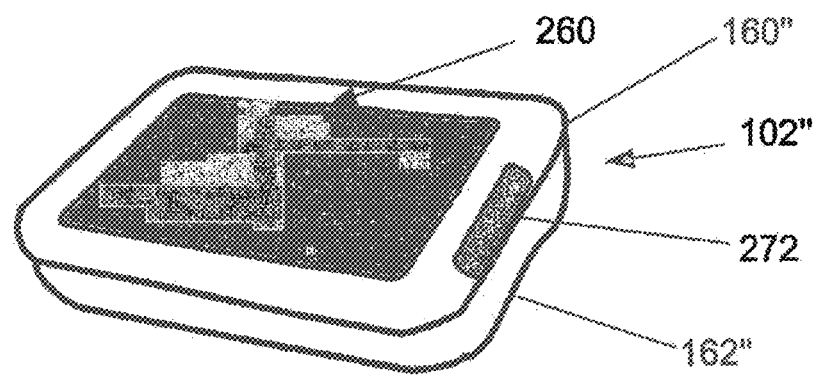
FIG. 29 is an isometric view of a cushioned user interface or control device in accordance with the present invention, incorporating a handle for use in carrying the cushioned user interface or control device.
Figure 30:
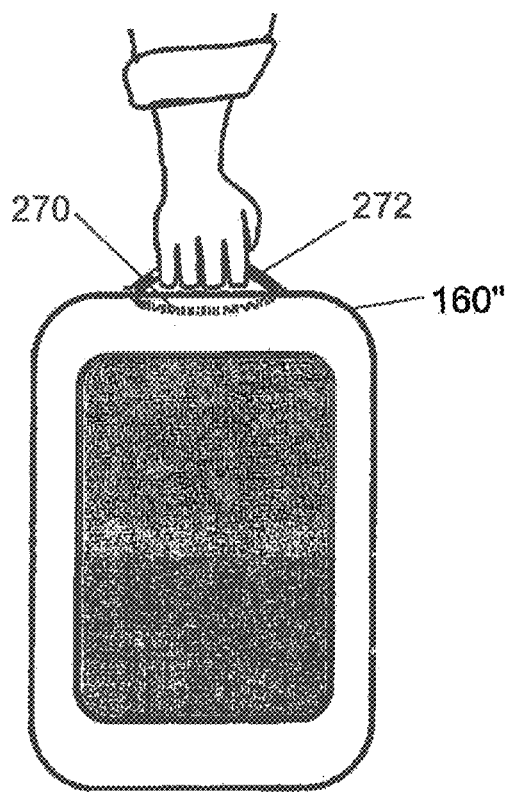
FIG. 30 is a side elevation view of the cushioned user interface or control device of FIG. 29.

FIGS. 29 and 30 illustrate a handle feature for the user interface or control device of the present invention. As shown in these Figures, the user interface or control device includes a support member 102", which has generally the same construction and operation as support member 102' shown and described above. In this version, support member 102" is formed of an upper section 160" and a lower section 162". The upper section 160" is formed so as to define a recess 270, and a handle member 272 is secured to upper section 160" over recess 270. The handle member 272 may be constructed so as normally to extend straight across recess 270 when not in use, as shown in FIG. 29. In use, handle member 272 is constructed so as to flex outwardly, in a manner as is known, between its ends as shown in FIG. 30. Recess 270 makes it easy for a user to grasp handle 272, and allows handle 272 to be placed in a recessed or flush orientation relative to the adjacent surfaces of support member 102" when not in use.

In the embodiment of FIGS. 29 and 30, the user input member is illustrated as convertible input member 260, although it is understood that the user input member may be any type of user input member. In addition, it is understood that the handle incorporated in support member 102" may be in any satisfactory form, and is not limited to the recessed and flexible handle as shown and described.

Figure 31:
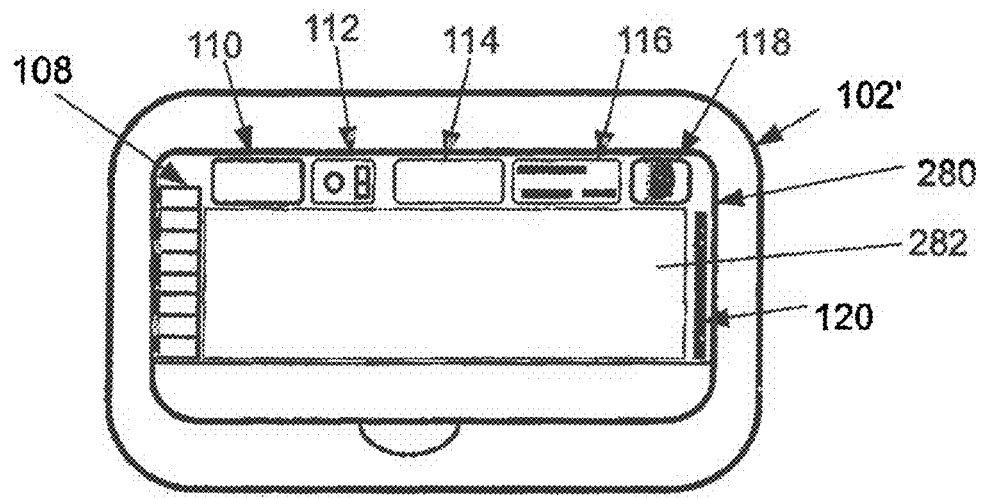
FIG. 31 is a top plan view of a touch screen-type cushioned user interface or control device in accordance with the present invention.
Figure 32:
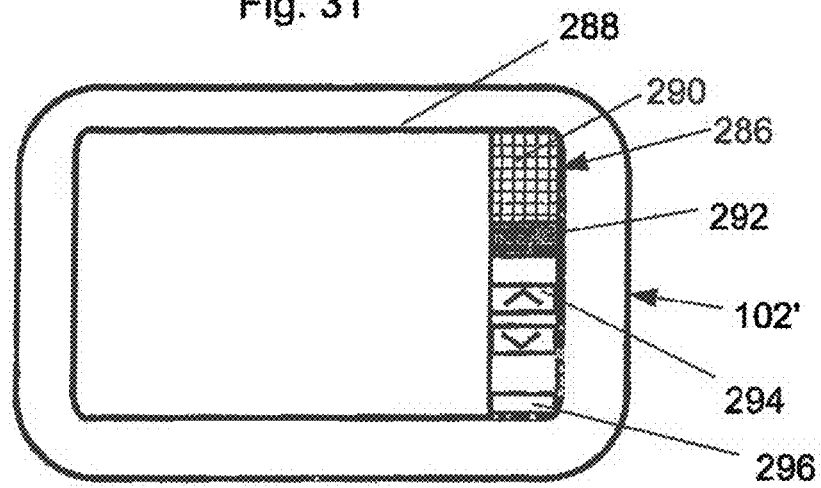
FIG. 32 is a top plan view of a screen-type cushioned user interface or control device in accordance with the present invention.

FIGS. 31 and 32 illustrate alternative user input members that may be incorporated in the user input and control device of the present invention. In both versions, a support member such as 102' provides cushioned support for the user input member. FIG. 31 illustrates a fully featured touch screen input member 280, which includes an LCD touch screen 282, positioned within recess 130 of support member 102'. In addition, the touch screen input member 280 includes additional peripheral components, such as (but not limited to) a set of device actuation keys or buttons 108, an audio speaker 110, a camera 112, and he docking station or synchronizing cradle 114, a memory card or disc reader 116, an identification device 118 such as a fingerprint scanner, and a card scanner at 120 such as for use in scanning credit cards or game cards, as shown and described above with respect to keyboard assembly 104. In this version, the touch screen 282 essentially replaces keypad 106 of keyboard assembly 104 as a user input area.

FIG. 32 illustrates a user interface member in the form of an electronic book controller 286, which includes a touch screen 288, positioned within recess 130 of support member 102'. In addition, the electronic book controller 286 may include peripheral components, such as (but not limited to) an audio speaker 290, a memory card and/or disc reader 292, a scroll-type actuation area 294, and a power switch 296.

Figure 33:
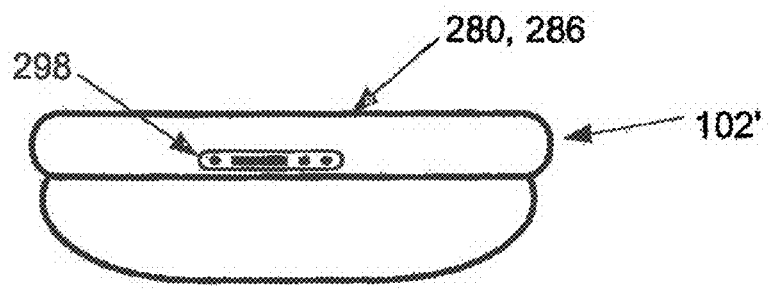
FIG. 33 is a side elevation view of the screen-type cushioned user interface or control device as in FIGS. 31 and 32.

In both versions of the user interface or control device as shown in FIGS. 31 and 32, the touch screen input member 280 and the electronic book controller 286 may be permanently secured to support member 102' such that the touch screen input member 280 or the electronic book controller 286 cannot be removed from recess 130. Alternatively, the touch screen input member 280 or the electronic book controller 286 may be removably secured within recess 130. In the former version, the external ports, phi and interface components of the touch screen input member 280 or the electronic book controller 286 may be built into cushion member 102' as shown at 298 in FIG. 33. In the latter version, and alternatively in the former version, the support member 102' may be provided with access openings through which the external ports, plugs and interface components of the touch screen input member 280 or the electronic book controller 286 can be accessed.

Figure 34:
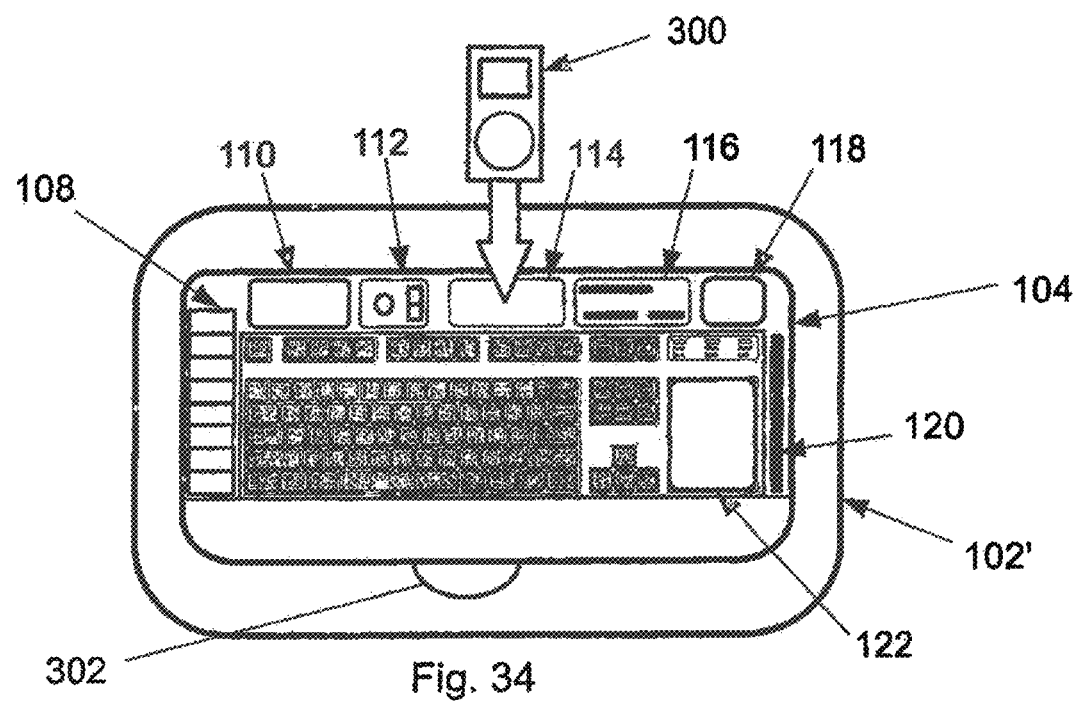
FIG. 34 is a top plan view of a keyboard-type cushioned user interface or control device in accordance with the present invention, including a docking station for a data storage device.

FIG. 34 illustrates the user interface or control device of the present invention as in FIG. 2, which includes support member 102' and the fully featured keyboard assembly 103. FIG. 34 illustrates engagement of a portable data storage device, such as an MP3 player 300, with the docking station or synchronizing cradle 114. In this manner, the user interface or control device of the present invention can be utilized as a synchronizing controller, which interfaces between keyboard assembly 104 and a computer with which keyboard assembly 104 is configured to communicate. In addition, keyboard assembly 104 may be configured such that music or other audio files stored in MP3 player 300 can be played directly on keyboard assembly 104 using audio speaker 110 or headphones that may be plugged into a jack associated with keyboard assembly 104.

Figure 35:
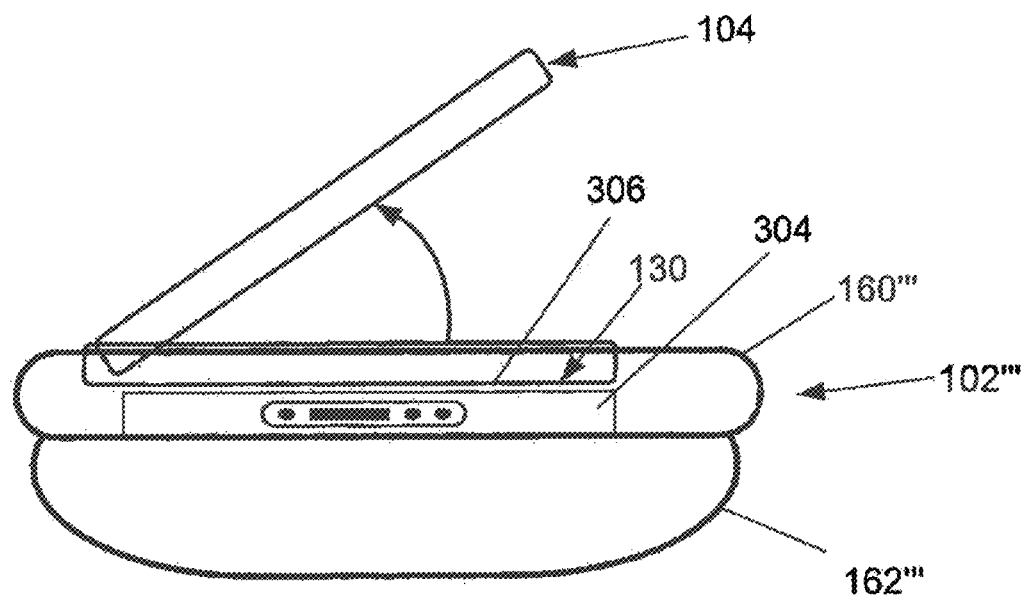
FIG. 35 is a side elevation view illustrating a storage compartment that may be

FIG. 35 illustrates a storage feature that may be incorporated into the user interface or control device of the present invention. As shown in FIG. 35, a support member 102''' has generally the same construction and operation as support member 102''' as shown and described previously. In this version, the input member, which may take any satisfactory form such as keyboard assembly 104, is removably engaged within recess 130. Representatively, the upper surface of upper section 160''' may be formed to include a recessed area 302, as shown in FIG. 34, which facilitates removal and engagement of keyboard assembly 104 from and with recess 130. As storage compartment 304 is formed in upper section 160''' of support member 102''' below recess 130. The storage compartment 304 may simply be another upwardly open recess in upper section 160''' that extends inwardly from recess 130, or may optionally include a cover panel 306 which forms a part of the bottom wall of recess 130 and which overlies the storage compartment 304. The storage compartment 304 may be used to store various items, such as memory cards, game cards, data storage devices such as flash memory modules, cords, cables, etc.

Figure 36:
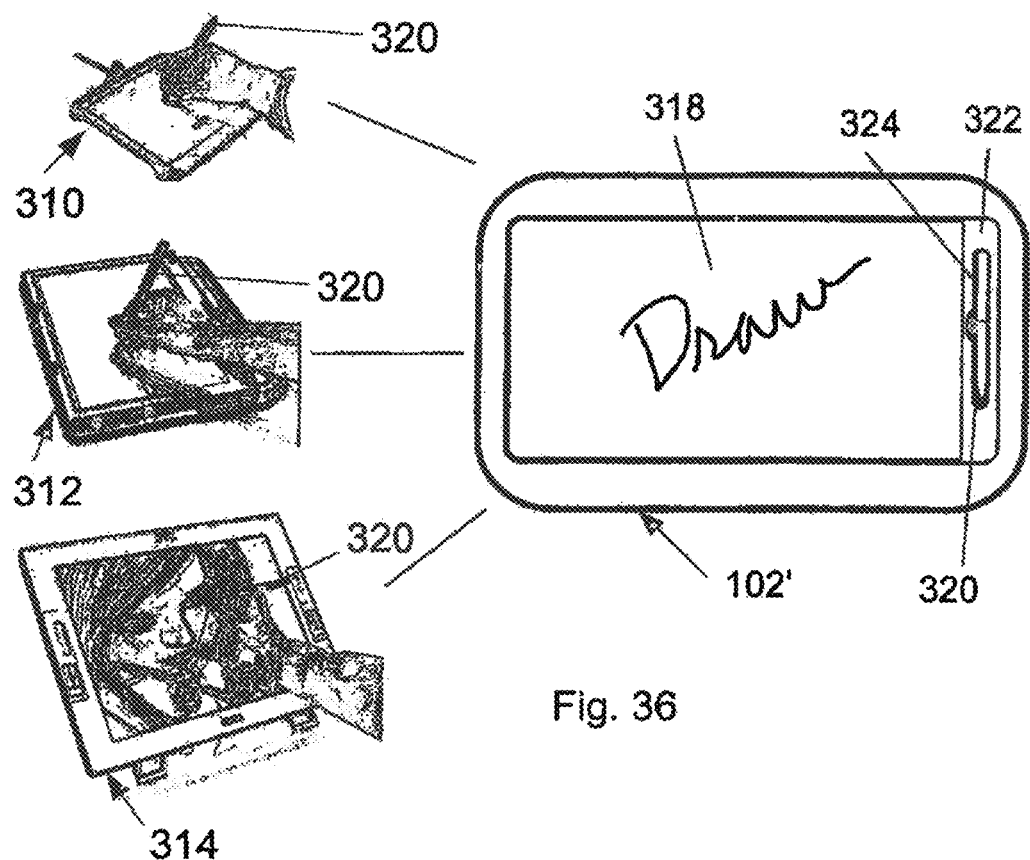
FIG. 36 is a view illustrating various versions of a screen-type cushioned user interface device in accordance with the present invention.
Figure 37:
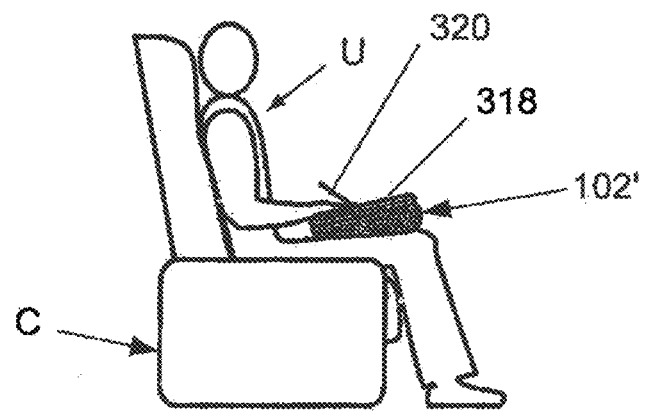
FIG. 37 is a side elevation view illustrating use of the screen-type cushioned user interface device of FIG. 36 by a user in a seated position.

FIG. 36 illustrates the user interface or control device of the present invention configured for use as a touch screen or sketch tablet user interface. In the embodiment of FIG. 36, support member 102' is constructed as described previously, including upper section 160 and lower section 162. Support member 102' is adapted to receive and support any satisfactory type of touch screen or sketch tablet user interface, and recess 130 is configured to accommodate the touch screen or sketch tablet user interface. Representative user interfaces include a graphic pen tablet 310, a PC tablet 312, or an interactive LCD pen tablet 314. Each version includes an input screen, which is representatively shown at 318, which is configured to be employed by a user to create manually input characters, sketches or renderings using an input stylus or pen 320. The user interface is configured to include a side area 322 adjacent screen 318, which may be formed with a recess 324 that is shaped so as to receive the stylus or pen 320 when not in use. The support member 102' allows a user to place the user interface in any desired position on any desired surface, which enables the user to comfortably and conveniently operate the input member. A representative position of the user interface is shown in FIG. 37, which shows the user U in a seated position on chair C, with support member 102' on the lap of the user U in order to allow use of the user interface in a comfortable seated position.

Figure 38:
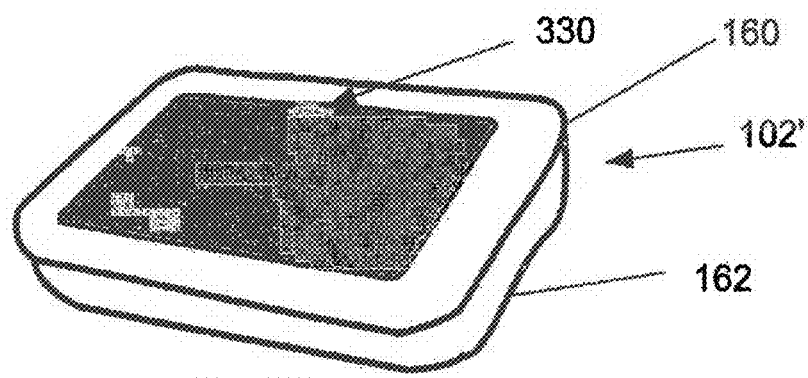
FIG. 38 is an isometric view of a game-type cushioned user interface device in accordance with the present invention.
Figure 39:
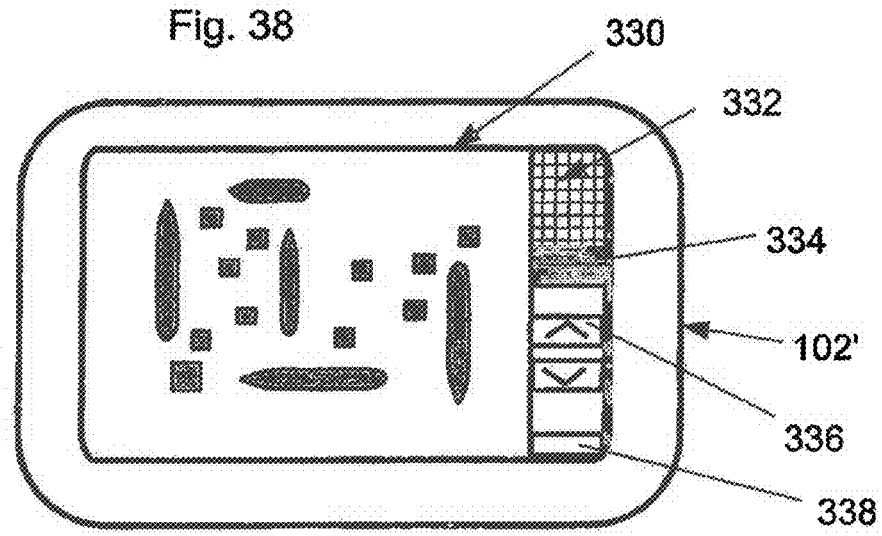
FIG. 39 is a top plan view of the game-type cushioned user interface device of FIG. 38.
Figure 40:
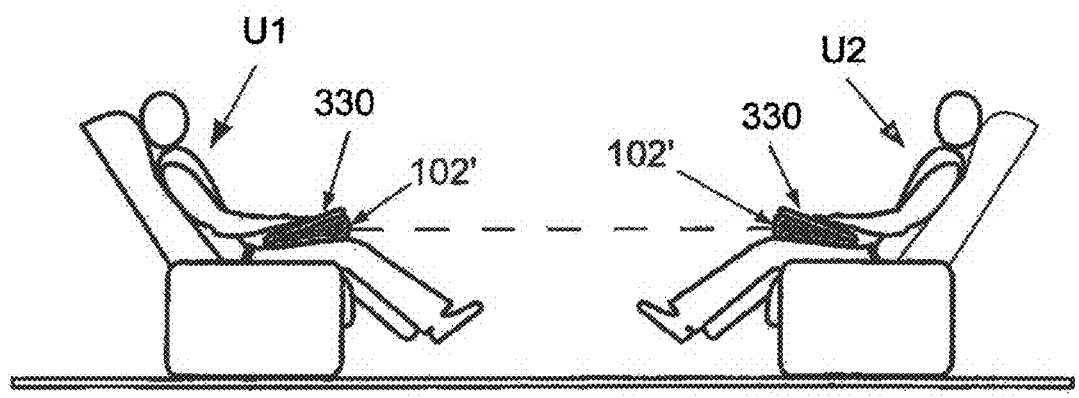
FIG. 40 is a side elevation view illustrating use of a pair of game-type cushioned user interface devices of FIG. 39 by a pair of users, each of which is in a seated position.

FIGS. 38 and 39 illustrate the user interface or control device of the present invention configured for use as a gaming device. In this embodiment, support member 102' is constructed as described previously, including upper section 160 and lower section 162. A user interactive display, which may be in the form of a touch screen 330, is positioned within recess 130 of support member 102'. In addition, the touch screen 330 may include peripheral components, such as (but not limited to) an audio speaker 332, a memory card and/or disc reader 334, a scroll-type actuation area 336, and a power switch 338. As with the user interface or control device as shown in FIGS. 31 and 32, the touch screen user interface 330 may be permanently secured to support member 102' such that the touch screen user interface 330 cannot be removed from recess 130. Alternatively, the touch screen user interface 330 may be removably secured within recess 130. The support member 102' allows a user to place the user interface 330 in any desired position on any desired surface, which enables the user to comfortably and conveniently operate the input member. Representatively, the user interface 330 may be positioned as shown in FIG. 40, in which shows a user U in a seated position on chair C, with support member 102' on the lap of the user U in order to allow use of the user interface 330 in a comfortable seated position. In certain games in which two or more users interact with each other in a competitive electronic game, each user may employ a user interface 330 that is supported by a support member 102'. In such applications, the user interfaces 330 include transmitting and receiving components that allow the user interfaces 330 to communicate with each other. Representative communication formats may include RF ID, infrared, Bluetooth, etc.

FIGS. 41-44 illustrate different types of user input members that may be incorporated in the user interface or control device of the present invention. In each case, the input member is carried and supported by a resilient, cushion-type support member such as support member 102'. FIG. 41 illustrates a steering wheel-type game controller 184 which includes a control over 188, as set forth above with respect to FIG. 13. Controller 184 may be carried by a mounting member 186, also as described with respect to FIG. 13, which may be permanently or removably engaged within recess 130 of support member with 102'. FIG. 42 illustrates a joystick-type game controller 350 supported by support member 102'. Controller 315 may be carried by a mounting member 352, which may be permanently or removably engaged within recess 130 of support member with 102'. FIG. 43 illustrates a floating handheld game controller 354 supported by support member 102'. In this version, the game controller 354 is located above an upper panel member 356, which may be permanently or removably engaged within recess 130 of support member with 102'. The upper panel member 356 provides a firm support below game controller 354 in the event the user wishes to rest his or her hands on support member 102' when using game controller 354. In this embodiment, the game controller 354 is secured to an arm 358, which extends outwardly from a front surface of support member 102' and curves rearwardly so that game controller 354 overlies and is spaced above the top surface of support member 102', formed by upper panel member 356. It is understood, however, that arm 358 may also extend outwardly from any other of the surfaces of support member 102', including a side or rear surface of support member 102' or the top surface of support member 102'. Arm 358 and may be constructed so as to be flexible, so that the user can move game controller 354 relative to support member 102'. In a construction in which arm 358 is secured to support member 102' so as to extend outwardly from a surface other than the top surface of support member 102', the top surface of support member 102' is clear so that the user is able to rest his or her hands in any location on the top surface of support member 102'. If desired, a camera and/or speaker phone, may be secured to arm 358 to provide video and/or audio inputs for interactive on-line gaming using game controller 354. FIG. 44 illustrates a keyboard-type game controller 180, as shown in FIG. 13, supported by support member 102'.

Figure 45:
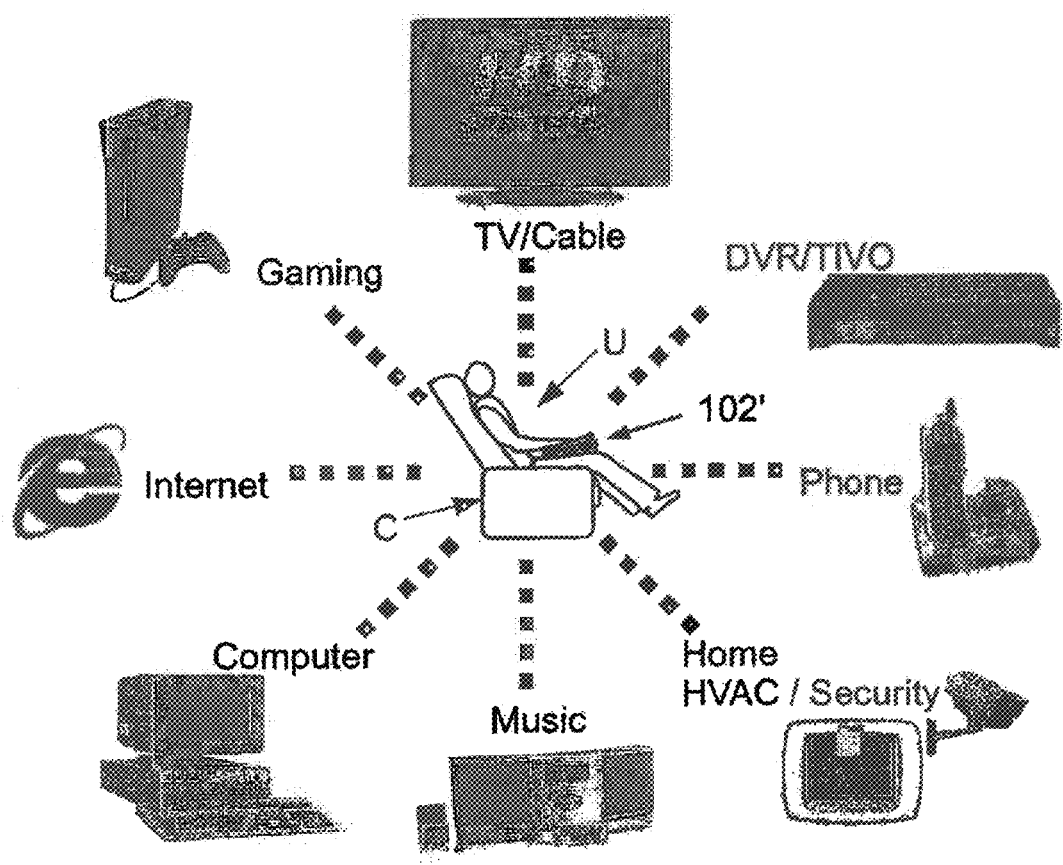
FIG. 45 is a schematic view representing use of a cushioned interface or control device in accordance with the present invention configured to interact with and/or control various devices and equipment.

FIG. 45 illustrates that the user interface or control device of the present invention may be used for numerous applications in purposes, all of which can be accomplished while the user U is comfortably positioned, such as on a chair C, or on any other desired article of furniture or on the floor. The input member which is supported by support member 102' may be any of the input members as shown and described previously, such as the keyboard assembly 104 or the LCD touch screen input member 280. It is also understood that the input members may be interchangeably secured to support member 102' in order to enable user to quickly and conveniently exchange one input member for another according to the desired function to be carried out using the input member. The user interface or control device of the present invention may be used to remotely control a television or cable box, a DVR recorder, a digital telephone, digital HVAC and home security systems, a digital music system, a computer, an Internet device which may or may not be associated with the computer, and a gaming device, also which may or may not be associated with the computer.

Figure 46:
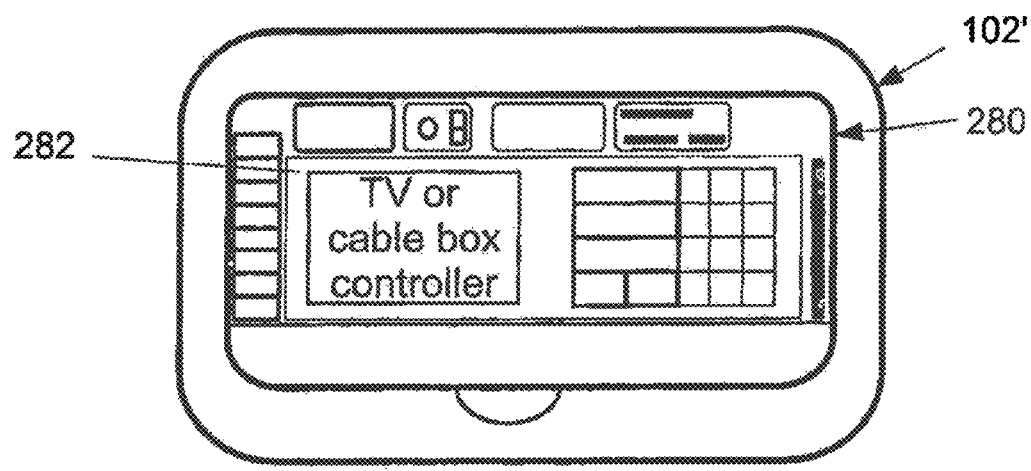
FIG. 46 is a top plan view of a cushioned user interface or control device in accordance with the present invention, showing a screen configuration configured to control a television or cable box.
Figure 47:
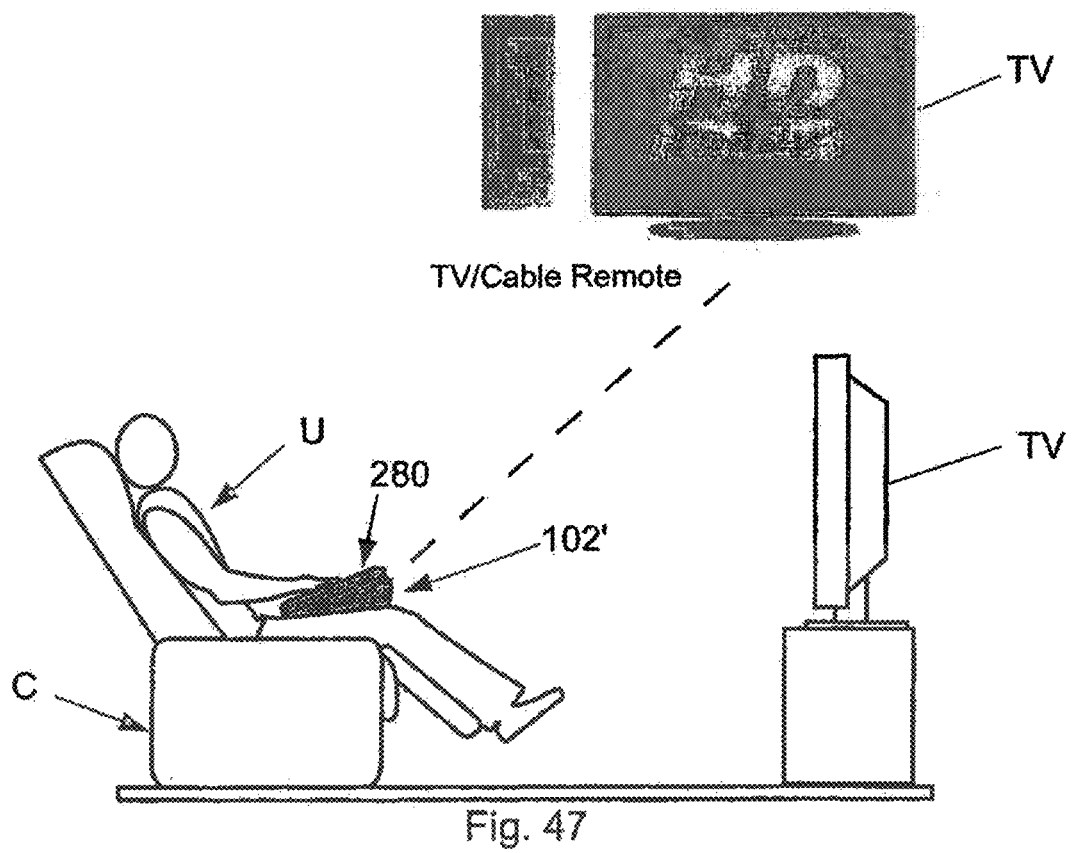
FIG. 47 is a side elevation view showing use of the cushioned user interface or control device as in FIG. 46 by a user and configured to control a television or cable box.
Figure 48:
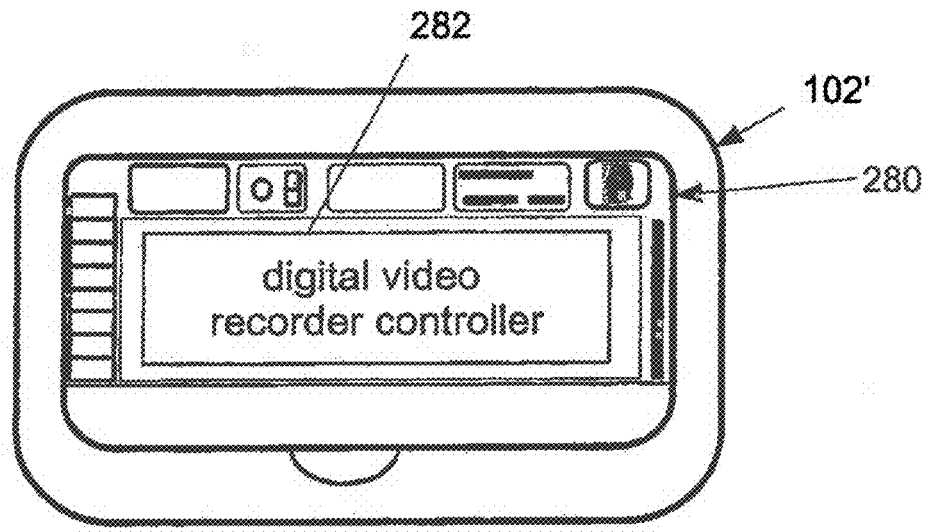
FIG. 48 is a top plan view similar to FIG. 46, showing a screen configuration configured to control DVR equipment.
Figure 49:
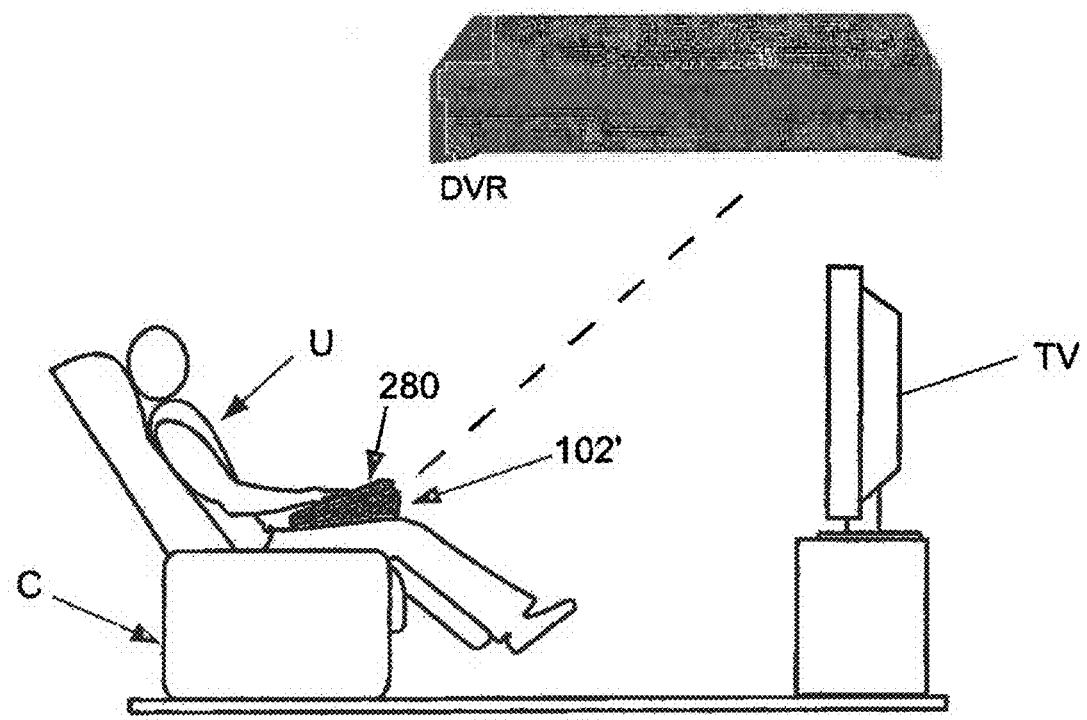
FIG. 49 is a side elevation view showing use of the cushioned user interface or control device as in FIG. 48 by a user and configured to control a DVR box.
Figure 50:
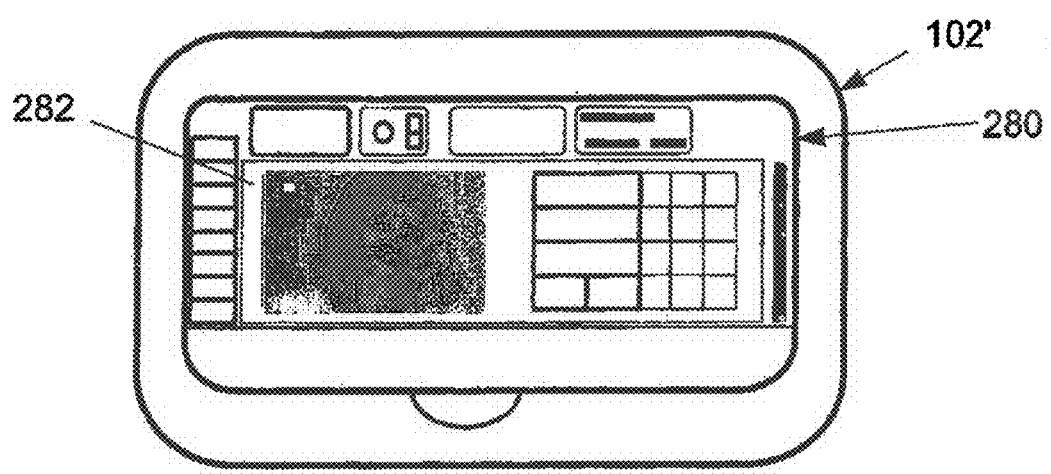
FIG. 50 is a top plan view similar to FIGS. 46 and 48, showing a screen configuration configured to control a telephone.
Figure 51:
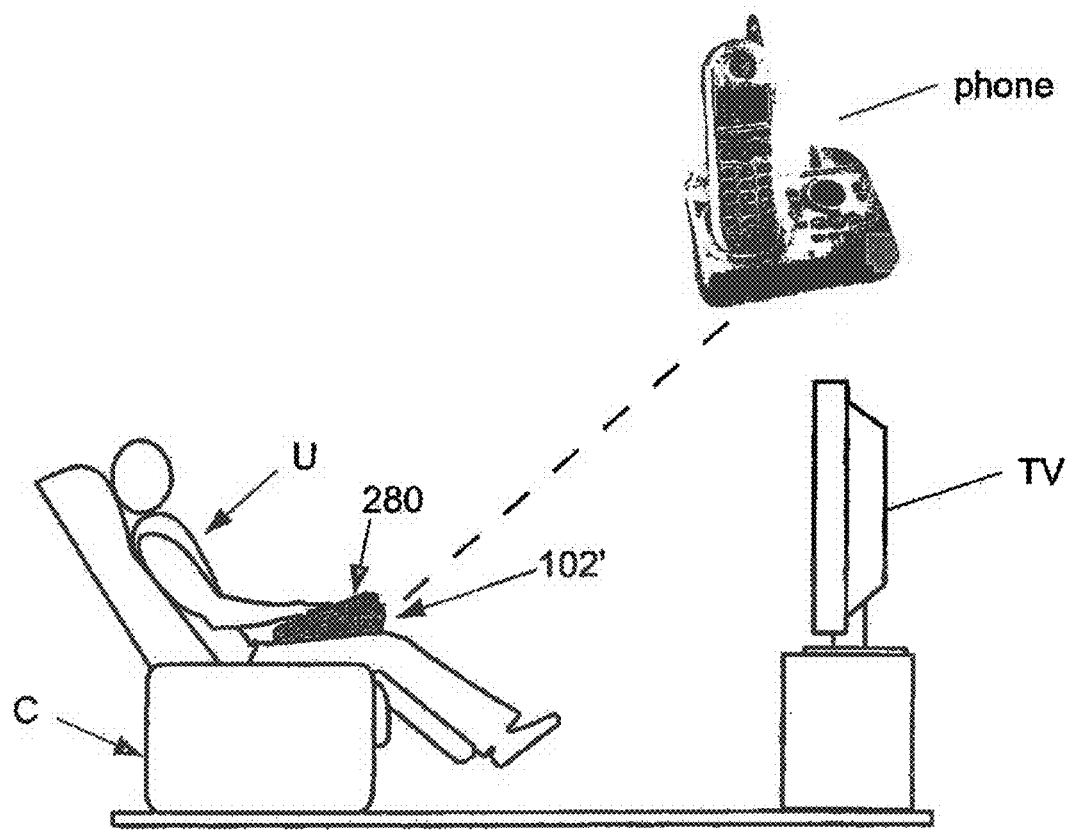
FIG. 51 is a side elevation view showing use of the cushioned user interface or control device as in FIG. 50 by a user and configured to control a telephone.
Figure 52:
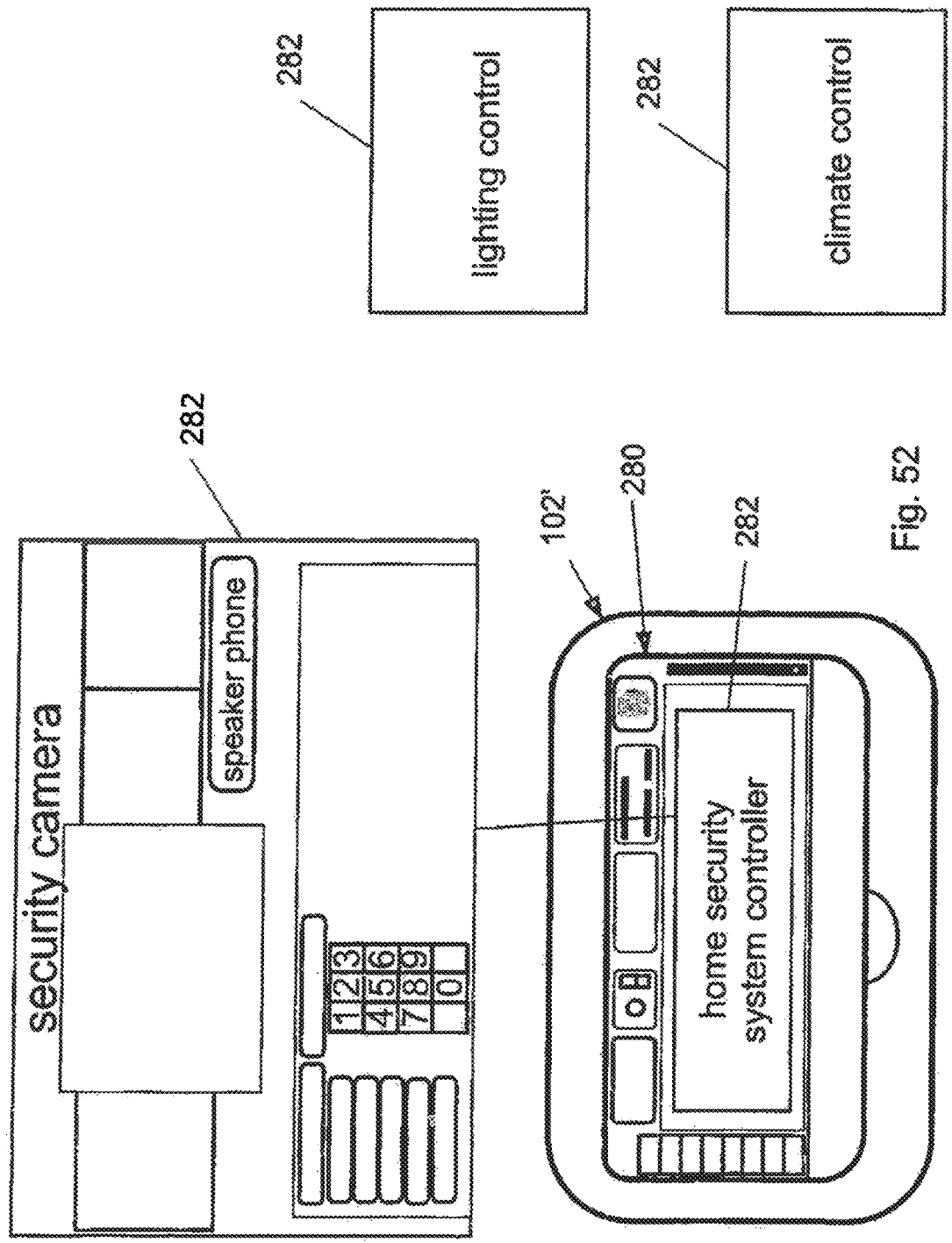
FIG. 52 illustrates screen configurations for use in connection with the cushioned user interface or control device in accordance with the present invention, configured to control controlling various home systems, such as a security system, climate control system or lighting system.
Figure 53:
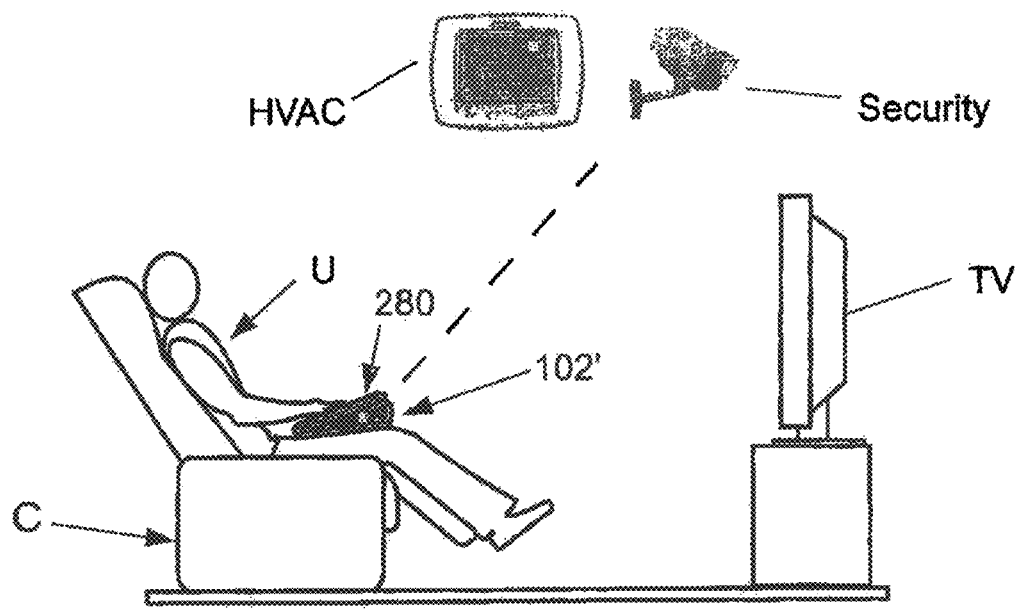
FIG. 53 is a side elevation view showing use of the cushioned interface or control device as in FIG. 52 configured to control the various home systems.
Figure 54:
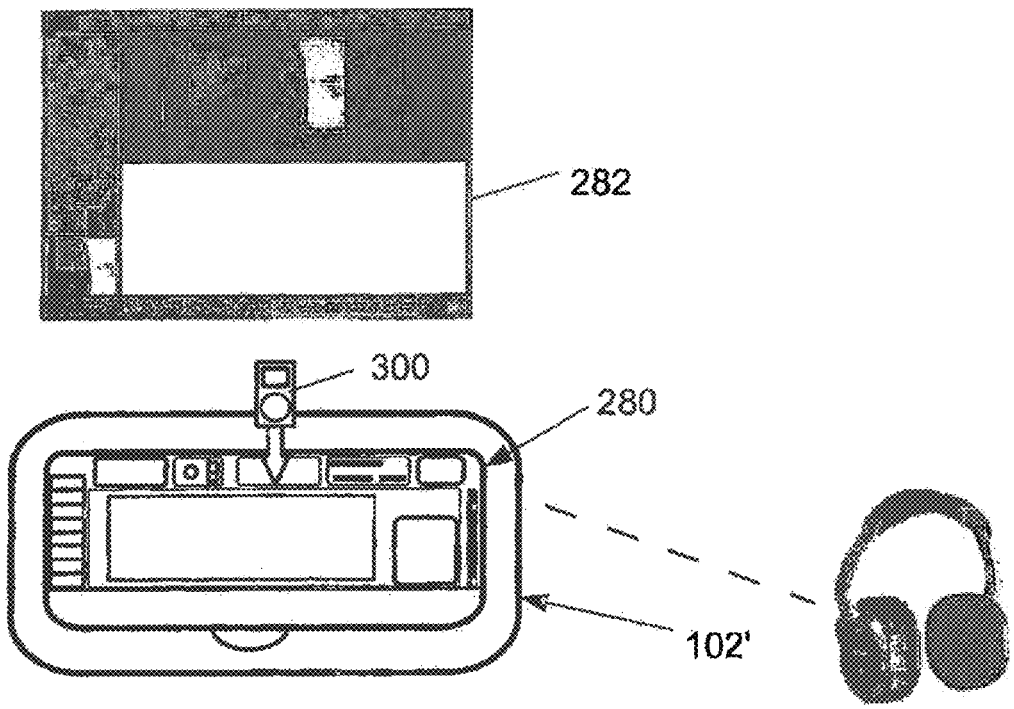
FIG. 54 illustrates a screen configuration for use in connection with the cushioned user interface or control device in accordance with the present invention, configured to control a data storage device such as an MP3-type music player.
Figure 55:
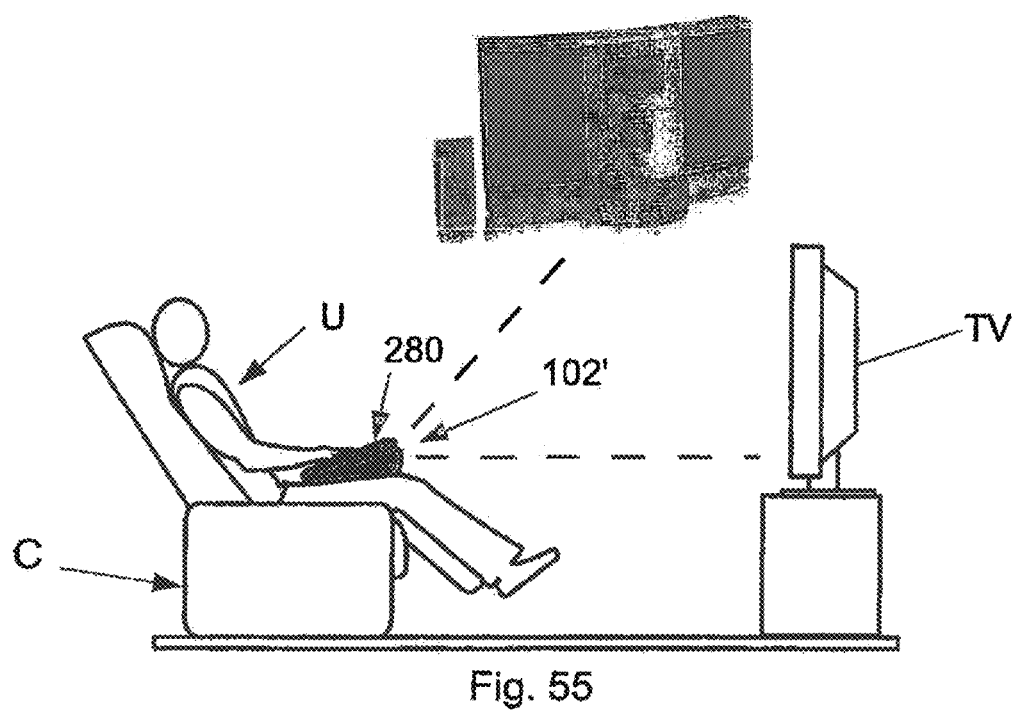
FIG. 55 is a side elevation view showing use of the cushioned interface or control device as in FIG. 54 configured to control a music system.
Figure 56:
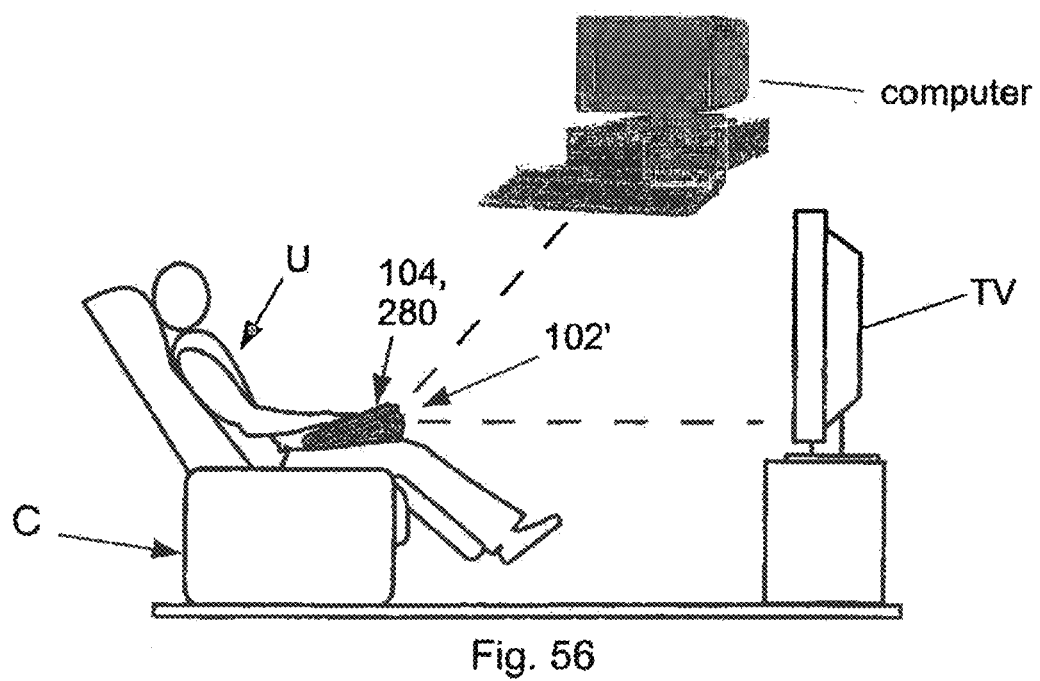
FIG. 56 is a side elevation view showing use of the cushioned interface ox control device in accordance with the present invention configured to interact with a remote computer.
Figure 57:
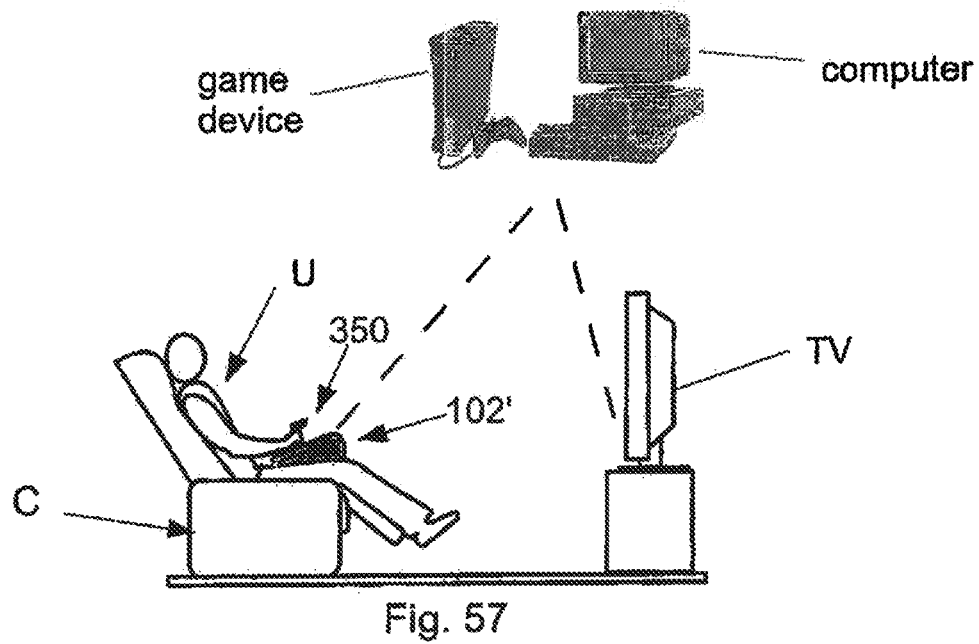
FIG. 57 is a side elevation view showing use of the cushioned interface or control device in accordance with the present invention configured to interact as a game controller with a remote computer.

FIG. 46 shows the configuration of the screen 282 of touch screen input member 280 for use as a television or cable box controller. FIG. 47 shows the user U seated in chair C, and using the touch screen input member 280 for remotely controlling the operation of a television, which may be interconnected with a cable box, satellite dish, etc. for providing signals to the television. FIG. 48 shows the configuration of the screen 282 of touch screen input member 280 for use as a digital video recorder controller. FIG. 49 shows the user U seated in chair C, and using the touch screen input member 280 for remotely controlling the operation of the digital video recorder, which is interconnected with a cable box, satellite dish, etc. for providing signals to a television. FIG. 50 shows the configuration of the screen 282 of touch screen input member 280 for use as a telephone controller. FIG. 51 shows the user U seated in chair C, and using the touch screen input member 280 for remotely controlling the operation of the telephone, which may be interconnected with a cable box, satellite dish, etc. for providing telephonic input signals. FIG. 52 shows the configurations of the screen 282 of touch screen input member 280 for use as controller for a home security system, a home lighting system, and a home HVAC system. FIG. 53 shows the user U seated in chair C, and using the touch screen input member 280 for remotely controlling the operation of the home security system, home lighting system, and home HVAC system. FIG. 54 shows the configuration of the screen 282 of touch screen input member 280 for use as controller for a music system, and also illustrates an audio output, which may be in the form of a set of headphones, to which input member 280 may broadcast audio signals. FIG. 55 shows the user U seated in chair C, and using the touch screen input member 280 for remotely controlling the operation of the music system. FIG. 56 shows the user U seated in chair C, and using the input member supported by support member 102', which may be in the form of keyboard assembly 104 or touch screen input member 280, for remotely controlling the operation of a computer, the display of which may be input to the monitor of a television. Similarly, FIG. 57 shows the user U seated in chair C, and using the input member supported by support member 102', which may be in the form of keyboard assembly 104 or touch screen input member 280, for remotely controlling the operation of a gaming device that may be interconnected with a computer, the display of which may be input to the monitor of the television.

Figure 58:
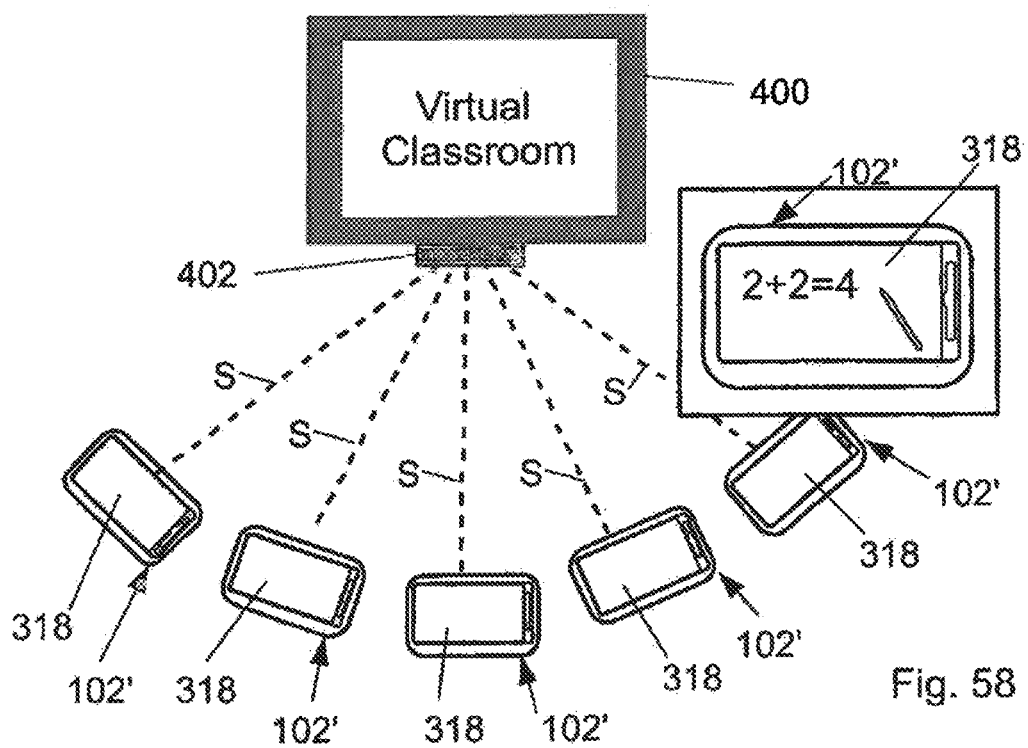
FIG. 58 is a schematic view illustrating use of the cushioned interface or control device in accordance with the present invention configured to interact as a user interface device in a remote learning application.

FIG. 58 illustrates a remote interactive system that can be carried out using the user interface or control device of the present invention. In the application as illustrated in the FIG. 58, a monitor or television screen 400 is used to display a visual image from a first location. At a second location that is remote from the first location, the image is viewed on the monitor or screen 400 by one or more users, each of which is provided with an interface device in accordance with the present invention. As above, each interface device includes a support member 102' and an input member, which may be in the form of any of the interface devices as described previously, such as a device having an input screen 318. The interface device is interconnected with a transmitter, which may be a wireless transmitter, so as to transmit input signals, shown at S, from the interface device. The input signals are received by a receiver 402, which may be located in the vicinity of monitor or screen 400. It is understood, however, that the receiver 402 may be in any other location. The receiver 402 receives the input signals S from the one or more interface devices, and transmits the signals to a remote location, which may be the same remote location from which the image is supplied to monitor or screen 400. The arrangement as illustrated in FIG. 58 is satisfactory for distance learning or home study, providing an online interactive classroom experience. The system is well suited for remote examination or test taking, which may take place in the home or in any other environment, and may involve a single or multiple users.

Figure 59:
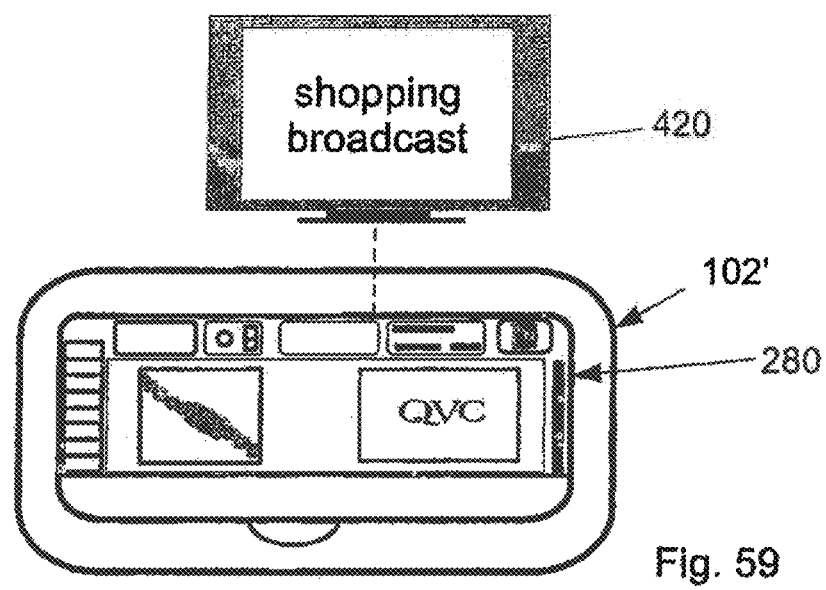
FIG. 59 is a schematic view illustrating use of the cushioned interface or control device in accordance with the present invention configured to interact as a user interface device in an online shopping application.

FIG. 59 illustrates an application of the user interface or control device of the present invention in a shopping application. In this application, the screen 282 of touch screen input member 280 is configured for use in online shopping, and may be configured for use simultaneously with a shopping broadcast on a television, monitor or other visual output device that is visible to the user. As in the previously described applications, the user may be seated in a chair or other article of furniture, and uses the touch screen input member 280 for remotely interacting with a computer in order to carry out a purchasing transaction. The user interface or control device receives signals, such as a Bluetooth signal, from a transmitter that may be interconnected with a monitor or screen 420, such as associated with a television or computer. The display screen 282 is configured so as to display the same image as is being displayed on monitor or screen 420, and also includes a user interactive section adjacent the broadcast image. The user interactive section may include a video phone, as well as other components or features that can be used in connection with online shopping, such as a digital pen, a card reader, etc.

Figure 60:
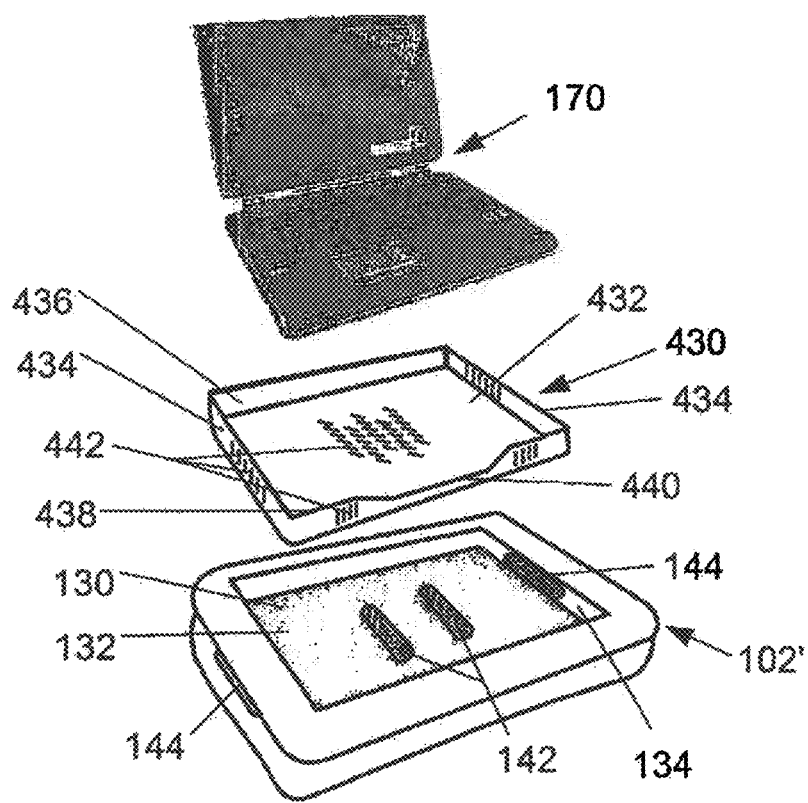
FIG. 60 is an exploded isometric view illustrating another embodiment of the user interface or control device of the present invention.

FIG. 60 shows an embodiment of the user interface or control device of the present invention similar to that shown and descried with respect to FIG. 13, and which may include a protective cover 192 as in FIG. 13 (not shown in FIG. 60).

As in FIG. 13, support member 102' includes the air vent inlets 142 and outlets 144 associated with recess 130. In addition, this version of the user interface or control device of the present invention includes a tray or liner 430 which is configured to be positioned within recess 130 of support member 102'. Tray 430 includes a bottom wall 432, side walls 434, a rear wall 436 and a front wall 438 which is formed with shortened central area 440. Tray 430 is configured to receive the user input device that is adapted to be used with support member 102', which in FIG. 13 is illustrated as laptop computer 170. It is understood, however, that any other input device may be positioned within tray 430. Bottom wall 432, side walls 434, rear wall 436 and front wall 438 of tray 430 include vent slots 442, which enable air exhausted by the input member, such as computer 170, to exit recess 130 through inlets 142 and outlets 144 in order to prevent overheating of the input member. In addition, tray 430 may be employed to retain cover 192 in position within recess 130, by sandwiching the edge area of cover 192 between the tray walls 432, 434, 436 and the facing walls 134 of recess 130. These areas of cover 192 are constructed of a material, or include openings, which enable air to pass from within the interior of tray 430 and out of recess 130 through vent inlets 142 and outlets 144.

Figure 61:
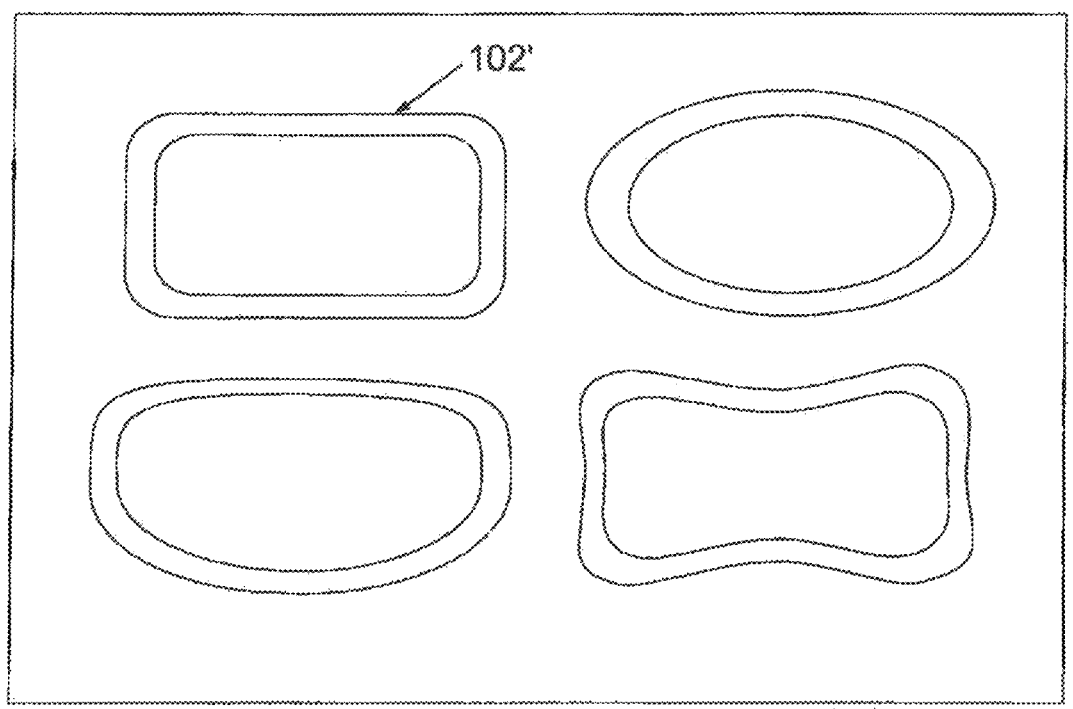
FIG. 61 is a view that illustrates representative alternative shapes of the user interface or control device of the present invention.

While the support member for the user interface and control device of the present invention has been shown as having a generally rectangular shape, it is understood that the support member may have any other shape as desired. Examples of other possible shapes are shown in FIG. 61, which shows an oval shape, an irregular kidney shape, and a bowtie-type, in addition to the rectangular shape as in the various other drawing figures.

In the various applications of the user interface or control device of the present invention as shown and described, it is understood that the input member may be other than a screen-type interface. For example, the input member may be in the form of a keyboard-type interface, and the graphic display may be on a television or other visual output device that is visible to the user.

The user interface or control device of the present invention may allow two users to interact with each other through a processing device such as a personal computer, which receives signals from one user and then can broadcast signals, such as by means of a wireless network, a Bluetooth connection, an RF ID system, etc., to a user of a second interface device. The second interface device can then be used by the second user to provide signals that are received by a receiver for display on a monitor or screen associated with the computer.

In all embodiments of the present invention, the resilient, cushioned support member provides a comfortable, cushioned support for a user interface device that provides flexibility and ease-of-use. The downwardly facing surface of the support member is capable of conforming to any type of surface, including a user's legs in the event the user is in a seated position.

Various alternatives and modifications are contemplated as being within the scope of the following claims, which particularly point out and distinctly claim the subject matter regarded as the invention.

I claim:

1. A user interface or control arrangement, comprising:
a cushion-type support member; and
a user interface device separate from the cushion-type support member and secured to the cushion-type support member, wherein the user interface device is arranged so as to face upwardly;
wherein the cushion-type support member includes a downwardly facing conformable lower surface located below the user interface device, wherein the downwardly facing conformable lower surface is defined by a variably shaped displaceable material having a shape independent of a shape of the user interface device, wherein the variably shaped displaceable material enables the downwardly facing conformable lower surface to displace and conform to the contours of a surface on which the cushion-type support member is placed independent of the shape of the user interface device and also enables variation in the orientation of user interface device relative to the surface on which the cushion-type support member is placed.

2. The user interface or control arrangement of claim 1, wherein the cushion-type support member has an upper section that includes an interface device mounting area and a lower section located below the upper section, wherein the lower section includes the downwardly facing conformable lower surface.

3. The user interface or control arrangement of claim 2, wherein the upper section is formed of a first foam material and the lower section is formed of a cushioning material other than the first foam material.

4. The user interface or control arrangement of claim 2, wherein the upper section and the lower section are formed of the same material.

5. The user interface or control arrangement of claim 1, wherein the user interface device comprises an interactive touch screen member.

6. The user interface or control arrangement of claim 1 wherein the user interface device comprises a game controller.

7. The user interface or control arrangement of claim 1, wherein the cushion-type support member includes a recess in an upper surface of the cushion-type support member within which the user interface device is positioned.

8. The user interface or control arrangement of claim 7, wherein the recess is defined by a bottom wall and a series of side walls, wherein the user input member is supported on the bottom wall of the recess when the user interface device is positioned within the recess.

9. The user interface or control arrangement of claim 8, wherein the side walls of the recess extend about a periphery of the user interface device.

10. A method of supporting a user interlace device, comprising the acts of:
providing a user interface device having a user input area;
providing a cushion-type support member separate from the user interface device, wherein the cushion-type support member includes a downwardly facing conformable lower surface located below the user interface device, wherein the downwardly facing conformable lower surface is defined by a variably shaped displaceable material having a shape independent of a shape of the user interface device; and
engaging the user interface device with the cushion-type support member such that the user interface device faces upwardly relative to the cushion-type support member;
wherein the variably shaped displaceable material enables the downwardly facing conformable lower surface to displace and conform to the contours of a surface on which the cushion-type support member is placed independent of the shape of the user interface device and also enables variation in the orientation of the user interface device relative to the surface on which the cushion-type support member is placed.

11. The method of claim 10, wherein the cushion-type support member has an upper section that includes an interface device mounting area and a lower section located below the upper section, wherein the lower section includes the downwardly facing conformable lower surface.

12. The method of claim 11, wherein the upper section is formed of a first foam material and the lower section is formed of a cushioning material other than the first foam material.

13. The method of claim 11, wherein the upper section and the lower section are formed of the same material.

14. The method of claim 10, wherein the user interface device comprises an interactive touch screen member.

15. The method of claim 10 wherein the user interface device comprises a game controller.

16. The method of claim 10, wherein act of engaging the user interface device with the cushion-type support member comprises positioning the user interface device in a recess in an upper surface of the cushion-type support member.

17. The method of claim 16, wherein the recess is defined by a bottom wall and a series of side walls, wherein the user interface device is supported on the bottom wall of the recess when the user interface device is positioned within the recess.

18. The method of claim 17, wherein the side walls of the recess extend about a periphery of the user interface device.

19. A user interface or control arrangement, comprising:
a cushion-type support member; and
a user interface device secured to the cushion-type support member, wherein the user interface device is arranged so as to face upwardly;
wherein the cushion-type support member includes a downwardly facing conformable lower surface located below the user interface device, wherein the downwardly facing conformable lower surface is defined by a variably shaped displaceable material having a shape independent or a shape of the user interface device, wherein the variably shaped displaceable material enables the downwardly facing conformable lower surface to displace and conform to the contours of a surface on which the cushion-type support member is placed independent of the shape of the user interface device and also enables variation in the orientation of the user interface device relative to the surface on which the cushion-type support member is placed.

20. The user interface or control arrangement of claim 19, wherein the cushion-type support member has an upper section that includes an interface device mounting area and a lower section located below the upper section, wherein the lower section includes the downwardly facing conformable lower surface.

21. The user interface or control arrangement of claim 20, wherein the upper section is formed of a first foam material and the lower section is formed of a cushioning material other than the first foam material.

22. The user interface or control arrangement of claim 20, wherein the upper section and the lower section are formed of the same material.

23. The user interface or control arrangement of claim 19, wherein the cushion-type support member includes a recess in an upper surface of the cushion-type support member within which the user interface device is positioned.

* * * * *

UNITED STATES PATENT AND TRADEMARK OFFICE
CERTIFICATE OF CORRECTION

PATENT NO.        : 9,552,077 B2  
APPLICATION NO.   : 14/322112  
DATED             : January 24, 2017  
INVENTOR(S)       : Paul W. Schneider Page 1 of 1

It is certified that error appears in the above-identified patent and that said Letters Patent is hereby corrected as shown below:

In the Claims

Claim 1, Column 16, Line 12, after "of" insert -- the --;

Claim 19, Column 18, Line 6, delete "or" and insert therefor -- of --.

Signed and Sealed this
Eighteenth Day of April, 2017

Michelle K. Lee
*Director of the United States Patent and Trademark Office*